May 12, 1964 B. S. HOLLAND 3,132,561

BOMBING COMPUTER

Filed Sept. 13, 1961 14 Sheets-Sheet 1

INVENTOR.
BERNARD S. HOLLAND
BY William P. Keegan
ATTORNEY

INVENTOR.
BERNARD S. HOLLAND
BY William P. Keegan
ATTORNEY

INVENTOR.
BERNARD S. HOLLAND
BY William P. Keegan
ATTORNEY

INVENTOR.
BERNARD S. HOLLAND
BY William P. Keegan
ATTORNEY

INVENTOR.
BERNARD S. HOLLAND
BY William P. Keegan
ATTORNEY

INVENTOR.
BERNARD S. HOLLAND
BY William P. Keegan
ATTORNEY

INVENTOR.
BERNARD S. HOLLAND
BY William P. Keegan
ATTORNEY

May 12, 1964 B. S. HOLLAND 3,132,561

BOMBING COMPUTER

Filed Sept. 13, 1961 14 Sheets-Sheet 8

INVENTOR.
BERNARD S. HOLLAND
BY William P. Keegan
ATTORNEY

INVENTOR.
BERNARD S. HOLLAND
BY William P. Keegan
ATTORNEY

May 12, 1964 B. S. HOLLAND 3,132,561

BOMBING COMPUTER

Filed Sept. 13, 1961 14 Sheets-Sheet 10

INVENTOR.
BERNARD S. HOLLAND
BY William P. Keegan
ATTORNEY

May 12, 1964 B. S. HOLLAND 3,132,561

BOMBING COMPUTER

Filed Sept. 13, 1961 14 Sheets-Sheet 11

INVENTOR.
BERNARD S. HOLLAND
BY William P. Keegan
ATTORNEY

May 12, 1964 B. S. HOLLAND 3,132,561

BOMBING COMPUTER

Filed Sept. 13, 1961 14 Sheets-Sheet 12

INVENTOR.
BERNARD S. HOLLAND
BY William P. Keegan
ATTORNEY

Fig: 19.
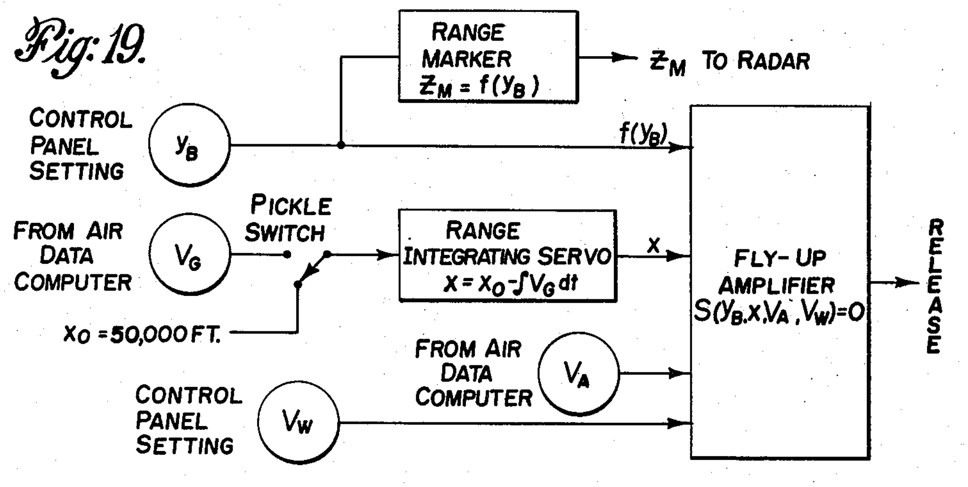
Fig: 21.
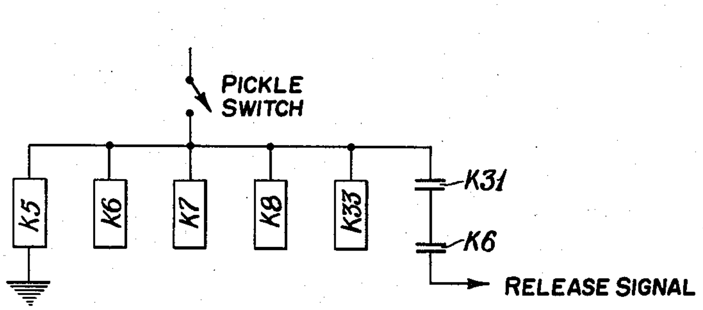
Fig: 22.
| SELECTOR SWITCH POSITION | S1A | S1B | S1C | S1D | S1E | S1F | S1G | S1H | S1J |
|---|---|---|---|---|---|---|---|---|---|
| OFF | O | O | O | O | O | O | O | O | O |
| STAND BY | X | X | O | O | O | O | O | O | O |
| DIVE TOSS | X | X | X | X | O | O | O | O | O |
| DIVE LOFT | X | X | X | X | O | X | X | O | O |
| LOW TOSS | X | X | X | O | O | O | O | O | X |
| LOW LOFT | X | X | X | O | O | X | X | O | O |
| LOW OTS | X | X | X | O | X | O | X | X | O |
| LEVEL CR | X | X | O | O | O | O | O | X | O |
| LEVEL HS | X | X | X | O | O | O | O | X | O |
X– INDICATES SWITCH ACTUATED
INVENTOR.
BERNARD S. HOLLAND
BY William P. Keegan
ATTORNEY May 12, 1964

B. S. HOLLAND 3,132,561

BOMBING COMPUTER

Filed Sept. 13, 1961

14 Sheets-Sheet 14

INVENTOR.
BERNARD S. HOLLAND
BY William P. Keegan
ATTORNEY

United States Patent Office 3,132,561
Patented May 12, 1964

3,132,561
BOMBING COMPUTER

Bernard S. Holland, Jamaica, N.Y., assignor to Eltra Corporation, a corporation of New York
Filed Sept. 13, 1961, Ser. No. 137,823
12 Claims. (Cl. 89—1.5)

This invention relates to an apparatus for bombing from aircraft and more particularly to such apparatus for automatically releasing a bomb during the pull-out from a bomb aiming maneuver executed by the aircraft preparatory to, and as part of, the bombing operation. The invention, moreover, relates to an apparatus which can accurately release a bomb to intersect a target for any one of a plurality of maneuvers to the target.

Heretofore, bombing apparatuses have been provided to effect release of a bomb while the aircraft is engaged in a single prescribed maneuver. Thus one bombing apparatus may be adapted to release a bomb while the aircraft is in level flight at a high altitude over the target. Another bombing apparatus may be adapted to release a bomb during a fly up from a low altitude level approach to the target, such an apparatus being styled a low altitude bombing apparatus. Still another bombing apparatus may be adapted to release a bomb during the pull-out from a diving maneuver at the target. A form of the latter type apparatus, which may be termed a toss bombing apparatus, is disclosed in Patent No. 2,910,916 assigned to the assignee of the present invention. While each of the foregoing type bombing apparatuses has been satisfactory in use, and indeed the latest developments thereof have led to eminent success in releasing a bomb to accurately intersect a target, they are limited in that the pilot of a bombing aircraft must undertake a prescribed maneuver in order to realize a successful bombing operation. It is to overcome this shortcoming that the apparatus according to the present invention is provided. Such apparatus is especially suited for toss and low altitude operations.

In toss bombing, the bomb is released, not during the dive itself, but at some point in the pull-out path followed by the aircraft in concluding the dive in order to give the bomb an initial velocity such that the bomb velocity vector is above the straight line between the diving aircraft and the target. The angle between the bomb velocity vector and the aircraft target line is termed the angle of divergence. By controlling the point of release of the bomb as a function of the angle of divergence, the bomb trajectory can be made to intersect the target regardless of the attitude of the aircraft at bomb release, or the target angle at which the aircraft approached the target, or the numerous other factors which have to be taken into account when engaged in bombing. Similarly in low altitude bombing the bomb is not released during the level approach to the target but at some point in the pull-out path followed by the aircraft in concluding the bombing run.

Since the particular point of bomb release is dependent on many factors, an automatic computing device is ordinarily provided to actuate the bomb release mechanism and thus relieve the pilot from exercising his judgment as to when the bomb should be released. The computing device which will hereinafter sometimes be referred to as the computer, takes into account many factors, or elements of aim, such as the angle at which the aircraft approaches the target, the altitude at which the bomb is released, the velocity of the aircraft, the prevailing winds in the atmosphere at the target site, and the ballistic characteristics of the bomb. Certain of these quantities are measured and introduced into the computer by instrumentalities which are components of the bombing apparatus, certain other of the quantities are introduced into the computer by controls manually operated by the pilot, and still others are received as input signals from avionic equipment provided in the aircraft.

Aforementioned Patent No. 2,910,916 disclosed an apparatus which provided a three dimensional cam rotatably set in accordance with the dive angle at which the aircraft approaches the target and a follower positioned longitudinally with respect to the cam axis in accordance with the altitude and speed of the attacking aircraft. The radius of the cam at the point where the follower contacts the cam surface is proportional to a theoretical angle of divergence as computed for vacuum ballistics. Electrical means are provided which in response to the position of the follower on the cam surface supply a voltage output representative of the theoretical angle of divergence. Additional electric means are provided which supply output voltages proportional to the various elements of aim hereinabove referred to, and these additional means are connected in a summation circuit together with the electrical means responsive to the theoretical angle of divergence to provide a voltage proportional to a corrected angle of divergence. Means also are provided in the summation circuit to supply a voltage representative of an angle which continually changes as the aircraft traverses its path of pull out from the dive, which voltage may either be received as an output signal from other avionic equipment provided on the aircraft or may be supplied by a gyroscope made a part of the computer equipment, so that when such angle coincides with the corrected angle of divergence, the bomb release mechanism is actuated to release the bomb.

The present invention similarly is embodied in an electromechanical apparatus but it is intended to provide additional modes of operation and to increase the range of applicability of the former device. Thus where the former apparatus was restricted to performance within certain altitudes and aircraft speeds, it is an object of the present invention to provide an apparatus that will function up to the tropopause and in aircraft traveling at supersonic speeds. It is also an object of the present invention to permit the utilization of bombs that are detonated above a target rather than on the target itself. Such bombs may be tactical special purpose bombs or conventional bombs which are exploded by proximity or barometric devices. This feature may be termed the "burst-above-target" embodiment. It is still another object of the present invention to provide an apparatus that may be used with a wider class of bombs having greater variances in ballistic characteristics. Another object of the invention is to provide an apparatus wherein the release of the bomb during a dive approach toss bombing operation may be effected at a second release point higher in the pull-out path than the conventional first release point. Another object of the invention is to provide an apparatus wherein a bomb may be released at a first or second release point after a level, low altitude approach to the target. Still another object of the invention is to provide an apparatus which will release a bomb "over the shoulder" during the pull-out from a level, low altitude approach to the target. Another object of the invention is to provide an apparatus capable of releasing a bomb to intersect a target when the initial approach to the target area is at a high altitude with the aircraft traveling at a high speed or at a cruising speed in approximately level flight. In this latter mode of operation sighting of the target is by radar.

Features and advantages of this invention may be gained from the foregoing and the description of a preferred embodiment of the invention which follows.

In the drawings:

FIG. 19 is a similar block diagram for the level, high altitude cruise speed mode of operation;

FIG. 21 is a schematic wiring diagram of the pickle button circuit; and

FIG. 22 is a tabular representation showing the switch contacts operated by the bombing mode selector switch.

Figure 1:
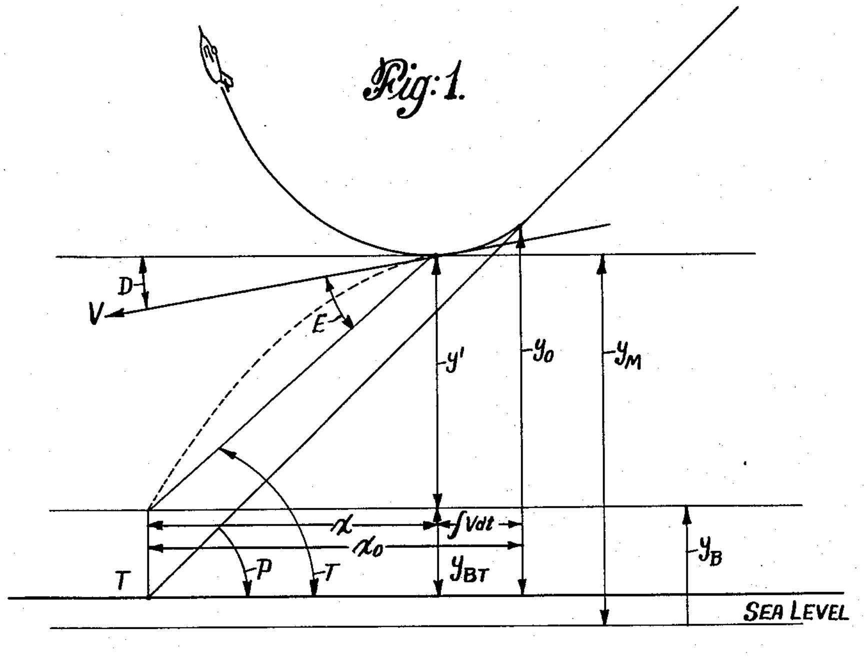
FIG. 1 is a schematic representation of a dive-toss bombing maneuver.

The general bombing problem is to release a bomb from a moving aircraft at a certain point in the aircraft flight path such that the free-fall trajectory of the bomb will terminate at the desired target point. The computer according to the present invention determines the required release point in the aircraft flight path in terms of an instantaneous geometric angular relationship between the aircraft and the target point. The angular relationship is in turn defined by data supplied to the computer such as horizontal range to the target, and instantaneous aircraft behavior with respect to attitude, speed, and altitude, in relation to the target point. Based on this data, the computer continuously computes during the aircraft bombing maneuver an angular relationship between the aircraft and the target point. When the aircraft passes through a point in its flight path that satisfies this angular relationship, the bomb is automatically released at that point.

The basic approach of the present apparatus is to define the angular relationship on the ideal basis of free-fall of the bomb in a vacuum. The relationship is then modified in accordance with factors that arise when the free-fall of the bomb occurs in a non-vacuum atmosphere. Such factors are the drag encountered by the bomb as it falls and the effect of moving air masses on the falling bomb. Other factors such as the aircraft angle of attack and the effect on bomb fall when the bomb is forcibly ejected from the aircraft also are considered.

In the bombing apparatus the required angular relationships are defined in terms of voltages which are functions of the various geometric factors involved. These voltages become the input data for the analogue computing circuitry of the bombing apparatus that determines the required release point.

As previously pointed out, the present apparatus computes the required point of bomb release for a number of maneuvers that may be followed in approaching the target. The various maneuvers will be briefly defined before proceeding to the description of the bombing apparatus.

The selection of the bombing maneuver and the consequent mode of operation of the bombing apparatus is governed by the approach altitude, the requirements for safe escape, and the availability of a suitable identification point. Thus, if the tactical situation indicates that a high altitude approach is preferable, the diving maneuver will be selected. If an approach close to the terrain is preferable, then the low altitude, level approach maneuver will be used. This approach, however, requires a suitable identification point which can be used for "sighting" the target. The selection of either toss, i.e., first release, or loft, i.e., second release, depends on the requirements for safe escape. When the bomb is lofted it follows a high trajectory and thus takes a greater interval of time to reach the target, thereby permitting the bombing aircraft to fly a greater distance from the target area and the field of the bomb burst. When special purpose tactical bombs are used and a diving or low altitude approach to the target is resorted to, a second release or lofting of the bomb would be the selected mode of operation. The absence of a suitable identification point requires an over-the-shoulder release in low altitude approaches. In this maneuver the target itself serves as the identification point. The high altitude level releases are used for blind bombing where resort is had to radar sighting of the target.

*Dive-Toss Bombing Maneuver*

The various modes of bomb release may be better understood by reference to the drawings wherein FIG. 1 represents the geometry of a dive-toss bombing maneuver. The aircraft approaches the target, which is sighted by means of the aircraft gun sight, along the path—and at some point during the dive, designated the "pickle" point, a button is depressed by the pilot to initiate operation of the bombing computer. By so initiating operation of the computer, the pilot is in effect establishing the initial horizontal range reference $x_0$. This reference will be referred to hereinafter when mechanization of the computer is considered.

The pickle button is depressed whenever the pilot has a good sight on the target, although the longer he delays actuation of the button the more accurate will be the bomb release. Atmospheric conditions, however, may warrant actuation of the button at the earliest possible moment after the target is accurately sighted. This would be so if the pilot expects to fly into turbulence as he continues his dive. In such a case the more accurate bomb release would be obtained by a good sighting of the target while flying through a still atmosphere. In either case accuracy of the bomb drop is enhanced in the toss mode of operation when the pilot starts the pull-up as soon as possible after depressing the pickle buton, but not before the "fly-up" light is illuminated. This light serves to inform the pilot when the aircraft is within the region of applicability of the bombing apparatus. Therefore, in the dive toss mode pickling will usually be delayed until after the "fly-up" light is illuminated. The pickle button must be held until the bomb is released, which occurrence is indicated by extinguishment of the fly-up light. The mission may be aborted by releasing the pickle button prior to bomb release.

From the geometry of the drawing it can be seen that:

$$T=D+E \text{ or } E+D-T=0 \qquad (1)$$

This equation represents the vacuum release solution and must be modified by certain factors which, in the present apparatus, are related to the aircraft angle of attack, the ballistic correction, the wind correction, and the bore sight adjustment. It will be well to note here that all terms of the release equation are expressed as voltages as will be the modification factors. These voltages are then summed by a summation amplifier in accordance with the relationship given by the release equation. The release point is defined when the summation goes to zero at which time the summation amplifier triggers to initiate the bomb release signal.

The divergence angle E represents a solution of the vacuum ballistics equation. As such it is a unique function of the target angle T and a non-dimensional height parameter Y. The divergence angle is automatically defined by the three dimensional ballistics cam provided in the present computer. The cam is designed so that the function of E will be taken from the cam follower which is positioned longitudinally as a function of the non-dimensional height parameter Y while the cam is rotated as a function of the target angle T. The surface contour of the cam is such that the rise of the cam follower at any point on the cam surface will define the divergence angle E according to the unique parameters T and Y.

Aircraft Angle of Attack: The proper gyro pitch angle at release for a hit on target must be corrected for the angle of attack of the aircraft at release. As shown in FIG. 1 the angle D is the angle between the horizontal and the aircraft at release. As shown in FIG. 1 the angle D is the angle between the horizontal and the aircraft velocity vector. However, the present apparatus uses as a signal input the gyro pitch angle as defined by the inertial navigator. Since the angle of the aircraft velocity vector differs from the gyro pitch angle by the angle of attack A, a correction must be made to the instrument release equation. This is done by adding the aircraft angle of attack A to the release equation to give the modified equation $D+E+A-T=0$. The aircraft angle of attack A is measured and supplied by the air data computer as a signal input to the present apparatus.

Ballistics Correction Angle: The solution for the divergence angle E was based on the vacuum ballistics equations. Practical bombing conditions in a non-vacuum atmosphere will cause a bomb released on the basis of the vacuum solution to fall short of the target when such release occurs in the dive-toss mode of operation. Thus, for practical bombing conditions in the dive-toss mode, a correction for bomb drag must be applied to the release angle that will cause a delay in the release and thereby prevent the bomb from falling short of the target. This is done in the dive-toss mode by adding the ballistic correction angle B to the release equation to give $$D+A+B+E-T=0.$$

Wind Correction Angle: The previous solution for the release angle has been made with the consideration that the air mass about the aircraft is still. When the air mass is in motion, the aircraft's velocity vector will be affected. The wind correction for the dive-toss mode is accomplished by adding the angle W to the release equation to give $D+A+B+W+E-T=0$.

Bore Sight Adjustment: A correction angle S, called the bore sight adjustment, must be applied to the release equation to account for certain constant correction angles. Typical correction angles accounted for by this adjustment include a one degree bias in the angle of attack signal supplied by the air data computer, and a one-and-two-tenths degree bias that must be added for any particular bombing mission in which certain bombs are forcibly ejected from their pylons. The bore sight correction angle is manually set into the apparatus by rotating the bore sight calibration control at the computer to the required position. The setting is determined at the time of calibration of the computer. The bore sight adjustment is added to the release equation to give—

$$D+A+B+W+S+E-T=0 \qquad (2)$$

This is the release equation for the dive-toss mode of operation containing all correction factors and which, when satisfied, will result in a hit on the target.

When operating in the dive-toss mode, an "in limits" indication is given to notify the pilot that the aircraft is within the applicable region for this mode. This is done by causing the fly-up indicator light to come on when the divergence angle E is equal to or less than thirty degrees and the target angle T is between seven and seventy-five degrees. The function is performed by an applicability cam that is on the same axis as the three dimensional ballistics cam and rotates with it.

*Dive Loft Bombing Maneuver*

Figures 2, 3:
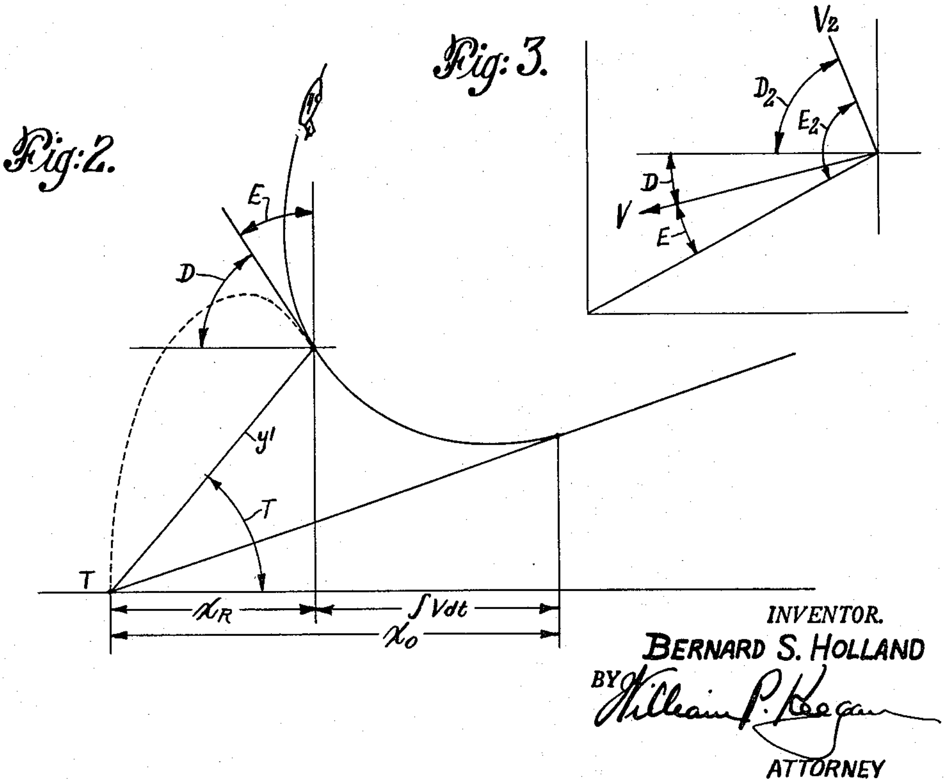
FIG. 2 is a schematic representation of a dive-loft bombing maneuver.
FIG. 3 is a representation of the divergence angle relationship for the dive-loft mode of operation.

The geometry of a dive-loft bombing maneuver is illustrated in FIG. 2. This mode of operation is similar to the dive-toss mode, but the bomb is released at a high angle release point reached after the aircraft passes through the release point indicated for a dive-toss operation. Referring to FIG. 2, the vacuum release equation for the dive-loft mode is $D+E-90=0$. Three things should be noted about this release equation, namely, (*a*) pitch angles, i.e., D, above the horizon are taken as negative. Thus the algebraic summation given by the release equation satisfies the geometric angular relationship shown in FIG. 2. (*b*) Although the parameter T, the target angle, does not enter into the release equation directly, it is a determining factor because the divergence angle E is defined, through the three dimensional ballistics cam, by a unique function of T and the non-dimensional height parameter Y. (*c*) The divergence angle is referenced from the velocity vector to the vertical. This is in contrast to the normal definition which references the divergence angle between the velocity vector and a line joining the aircraft and the target. However, an equivalent relationship exists between the differently referenced divergence angles as will now be explained.

In FIG. 3, $V_1$ and $V_2$ represent the velocity vectors for the dive-toss and dive-loft modes of operation, respectively. From the drawing it is clear that $E_2=-D_2+D+E$ when one bears in mind that pitch angles above the horizon are taken as negative. It can be algebraically determined from the vacuum ballistics equation that $E_2=90-D$. Substituting this value of $E_2$ in the equation given above results in $90+D=-D_2+D+E$ or $$-D_2+E-90=0$$

The angle $D_2$ in FIG. 3 is equivalent to the pitch angle D of FIG. 2. Thus the vacuum release equation for the dive-loft mode can be expressed as above $-D+E-90=0$ or $D-E+90=0$. This described divergence angle relationship thus permits the divergence angle E for the dive-loft mode to be solved in the same manner as is done for the dive-toss mode.

Corrections to the Vacuum Release Mode: The aircraft angle of attack A and the bore sight adjustment S corrections for the dive-loft release equation are the same as those described for the dive-toss mode. The ballistics correction B is similar to that described for the dive-toss mode. The same parameters are involved in the function that defines B, but the constants of the function are changed to account for the radically different time of weapon fall in the dive-loft mode. The wind correction W for the dive-loft mode is the same as described above for the dive-toss mode. It should be noted that the ballistics angle correction is applied in the opposite sense for the dive-loft mode because the release angle for this mode is beyond the angle resulting in the maximum range point of release, that is, the angle at which release of the bomb in the pull-up path will result in maximum range travel of the free-falling bomb. As the aircraft in the pull-up maneuver flies beyond this maximum range point, the range of the bomb decreases. Therefore, in order to increase the range of the bomb to correct for drag, the aircraft must release the weapon earlier. Accordingly, the ballistic angle correction is applied in the opposite sense to effect an earlier release. Similarly, the same head wind has a reverse effect on a climb velocity vector than it has on a dive velocity vector. Thus the wind correction angle must be applied in the opposite sense. The final release equation for the dive-loft mode of operation containing all correction factors and which, when satisfied, will result in a hit on the target, is thus—

$$D+A-E-B-W+S+90=0 \quad (3)$$

Two limit indications are given by the fly-up indicator light during operation in the dive-loft mode. One indication notifies the pilot during the maneuver if he is not "in limits" with respect to the offset target angle. The other indication identifies the optimum point in the flight path at which pull-up should be initiated.

"In Limits" Indication: During the dive-loft maneuver and before the pickle button is depressed, the fly-up indicator light will automatically blink on and off if the aircraft position with respect to the target is such that the target angle is not betwen seven and twenty degrees. The function is performed by the applicability cam previously mentioned and a blinker circuit in the computer. In this instance the circuits are so arranged that the blinker circuit will remain de-energized as long as the above noted "in-limit" condition is statisfied. Excursion of the applicability cam into a region outside of these limits causes the blinker circuit to be energized and results in continuous blinking of the fly-up indicator light.

Since a deferred pull-up in this mode might result in crossing the target before the release point is reached, a fly-up signal is given to the pilot at the optimum fly-up point in the flight path. During the maneuver, and after the pickle button has been depressed, the fly-up indicator light will come on and stay on to indicate to the pilot that pull-up should be initiated.

Computation of the pull-up point in the flight path is done automatically and is a function of the instantaneous horizontal range to the target as supplied by a function potentiometer driven by the range integrating servo, the true air speed of the aircraft as defined by the air date computer, and the estimated wind velocity as defined by the setting of the wind control knob at the control panel. All of these parameters are fed to the fly-up amplifier according to a defined functional relationship. The fly-up point is reached when the function goes to zero at which time the amplifier triggers a relay to energize the fly-up indicator light.

*Low Toss Bombing Maneuver*

Figure 4:
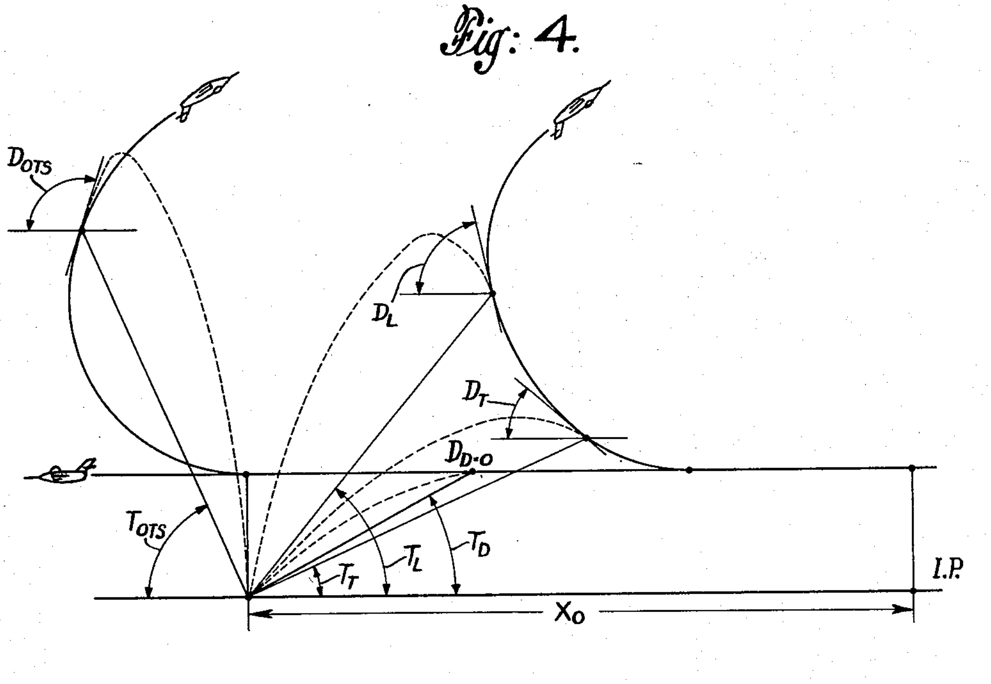
FIG. 4 is a schematic representation of the low altitude approach bombing maneuvers.

This mode of bombing is graphically depicted in FIG. 4. The maneuver is accomplished by flying level at a low altitude over an identification point and towards the target. The pickle button is depressed at the instant the aircraft passes over the identification point. Level flight is continued to an automatically computed fly-up point where a wings-level pull-up is initiated. While in the pull-up path the weapon is automatically released by the present apparatus at a low angle trajectory point in the path.

The equations used to define the low-tos mode deviate from the dive-toss equation in only one respect. Because the pilot does not dive at the target to establish the initial range $x_0$ reference point for the mission, some other means must be used to obtain the $x_0$ reference. This is done in the low-toss mode with the use of an identification point. An easily recognized landmark that is a known distance from the target becomes the identification point. The horizontal range distance between the identification point and the target is manually set into the computer by rotating an identification point distance control knob located on a control panel to the corresponding distance value. The pilot, by pickling at the instant the aircraft is over the identification point, establishes the initial range reference $x_0$ for the present mode of bombing.

Since the initial range $x_0$ does not affect the release equation directly, the same release equation for the low-toss mode is used as for the dive-toss mode, i.e., Equation 2. It should be noted that initial horizontal range determination is done in this mode by setting the identification point distance control at the control panel. Thus radar slant range or pressure altitude data are not required for determination of initial range in this mode.

Two limit indications are given by the fly-up indicator light during operation of the computer in the low-toss mode. One indication notifies the pilot during the maneuver if he is not "in limits" with respect to the position of the cam follower along the longitudinal axis of the three dimensional ballistics cam, while the second indication identifies the optimum point in the flight path at which pull-up should be initiated.

The approach altitude in the low-toss mode is a function of aircraft speed. During the approach to the target, the fly-up indicator light will automatically blink on and off if the approach altitude with respect to the aircraft speed is such that the cam follower position is correctly along the three dimensional cam. The blinking light advises the pilot that he should increase his approach altitude. During a correct approach the light remains off.

The "in-limits" function is performed by a potentiometer section in the L-bridge servo, and in conjunction with a blinker circuit in the computer. The circuits are so arranged that the blinker circuit will be energized whenever the approach altitude is incorrect.

The pull-up signal must be given to the pilot so that he does not initiate pull-up too soon. On the other hand, while a deferred pull-up will always result in a bomb release, a certain amount of safe escape is lost since the release will occur closer to the target. Thus an indication of the optimum fly-up point in the flight is required. This point is automatically computed in the same manner as described for the fly-up point signal in the dive-toss mode of operation. The functional relationship between the involved parameters is the same as before except that the constants of the function are changed to reflect the changed mode of operation.

Low-Dash Variation: A proper release point will always exist in the low-toss operation even though a pull-up is not executed. This means that in low-toss operation the aircraft can continue level flight towards the target instead of pulling up at the computed fly-up point. This is the low-dash variation and is also shown in FIG. 4. The computer operation for this variation is the same as for the low-toss operation but the pilot ignores the fly-up signal.

*Low-Loft Bombing Maneuver*

The low-loft mode of operation is also illustrated in FIG. 4 and is initiated in the same manner as the low-toss mode. The low angle trajectory release point is passed and the aircraft continues the pull-up through the high angle trajectory release point.

The equations used to define the low-loft mode deviate from the toss-loft equations in only one respect. Because the pilot does not dive at the target to establish the initial range $x_0$ reference point for the mission, some other means must be used to obtain the reference. The same method of initial range determination is used for the low-loft mode as is used for the low-toss mode, namely, the setting of the identification point distance control knob to accord with the range of a known identification point from the target. Thus radar slant range or pressure altitude are not required for this mode of operation.

Since the initial range $x_0$ does not directly affect the release equation, the same release equation that is used for the toss-loft mode can be used for low-loft mode. This is Equation 3.

As in the low-toss mode of operation, a fly-up signal must be given to the pilot so that he does not initiate pull-up too soon or defer pull-up too long. The fly-up point in the flight path is automatically computed in the same manner as in the dive-loft mode to which reference was previously made. The functional relationship between the parameters is the same except that the constants of the function are changed for the low-loft mode. The constants used are the same as those used for the low-toss mode of operation.

*Low-OTS Bombing Maneuver*

The low-OTS (over the shoulder) maneuver, illustrated in FIG. 4, is initiated in the same manner as the low-toss mode of operation. However, the low and high angle trajectory release points are both by-passed and the aircraft continues the pull-up through the vertical to the over-the-shoulder release point.

The equations used to define the low-OTS mode differ from the dive-loft equations only with respect to the definition of the initial range. For the low-OTS mode, the initial range $x_0$ is automatically set at zero since the initial range reference is established at the instant the aircraft passes over the target at which time the pickle button is depressed.

Integration of the horizontal range travelled after pickle must take place in both directions because at pickle the aircraft is flying away from the target whereas in the pull-up path, as the aircraft passes through the vertical it has reversed its direction and is flying towards the target. The inertial navigator equipment automatically supplies to the computer apparatus a reversal signal at the instant the aircraft passes through the vertical. This changes the sign of the true ground speed input $V_G$ from the inertial navigator.

The vacuum release equation for the low-OTS mode can be written—

$$D+E+90=0 \tag{4}$$

where the aircraft pitch angle D above the horizon is taken as negative.

The release point of the low-OTS mode is the mirror image of a release point in the dive-loft mode. Therefore the same form of release equation used for the dive-loft mode applies to the low OTS mode. It should be noted that the ballistics and wind correction factors are applied in accordance with the direction of the aircraft at the release point with respect to the target. The final release equation for the low OTS mode is—

$$D+A+E+B+W+S+90=0 \tag{5}$$

No limit indications by the fly-up indicator light are required for this mode, nor are radar slant range or pressure altitude data required for initial range determination.

*Level-HS Bombing Maneuver*

Figure 5:
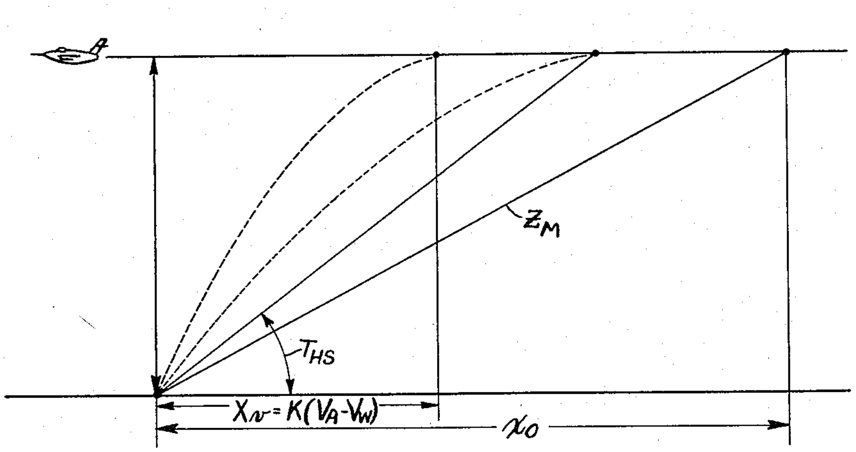
FIG. 5 is a schematic representation of the high level bombing maneuvers.

The level-HS (high speed) mode of bombing is illustrated in FIG. 5. A level approach to the target is made at a programmed high altitude and at high speed. The pickle button is depressed when the target, as seen on the radar scope, is coincident with a range strobe marker on the scope that is positioned by a radar signal supplied to the radar by the computer. Although level flight is generally continued to the release point in this mode, pull-up at the pickle point can be used as a variation of this maneuver.

The equations used to define the level-HS mode differ from that of the dive-toss equations only with respect to the definition of the initial range reference. The use of an identification point on the ground to establish the initial range reference would result in large errors because of the high altitudes and the high speeds resorted to in the level-HS mode. Therefore, the coincidence of the target with a range strobe marker, as seen on the radar scope, is used to establish the initial range reference and the marker is positioned by an initial range reference signal supplied to the radar by the computer.

Referring to FIG. 5, it can be seen from the right triangle relationship between $x_0$, $y'$, and $Z_m$ that if $x_0$ and $y'$ are defined, $Z_m$ is automatically determined. In the level-HS mode, the pilot must program the flight altitude at some selected value, thus defining $y'$. Similarly, the pilot selects an $x_0$ value in accordance with the expected ground speed to be used. Selection of $x_0$ is made by rotating the identification point distance control knob to the selected value, thereby establishing $x_0$. With $x_0$ and $y'$ defined, $Z_m$ is automatically determined.

The slant range strobe signal $Z_m$ is delivered to the radar and establishes the position of the range strobe marker on the radar scope. The pickle button is depressed at the instant coincidence between the target and the strobe marker is observed at the radar scope.

The vacuum release equation for the level-HS mode is identical to Equation 1 for the dive-toss mode. Consequently, the final release equation for the level-HS mode is the same as that for the dive-toss mode, that is, Equation 2.

No limit indications by the fly-up indicator light are required for this mode of operation, nor are radar slant range or pressure altitude data required for initial range determination.

*Level-CR Bombing Maneuver*

This mode of bombing, i.e., level-CR (cruise), is similar to the level-HS mode except that a level approach to the target is made at a fixed altitude of 35,000 feet above sea level and at any speed within the range of Mach 0.85 to Mach 0.95. As in the level-HS mode, the pilot pickles when the target, as seen on the radar scope, is coincident with the range strobe marker on the scope that is positioned by a range signal supplied to the radar by the computer. Level flight is continued through the release point.

The method for obtaining the initial range reference is similar to that employed for obtaining the same reference in the level-HS mode. However, in this instance the reference is automatically set at 50,000 feet. Since the aircraft is constrained to fly at 35,000 feet, $Z_m$, the radar range strobe signal, is automatically defined. The signal representing $Z_m$ is taken from a potentiometer set by the burst altitude control at the control panel. This signal is delivered to the radar to position the range strobe marker at the radar scope. The pickle button is depressed as coincidence between the target and the strobe marker occurs, thereby establishing the initial range reference for the computer.

The level-CR mode uses a greatly simplified release equation. This is made possible by the constraints placed on the programming of the mission with respect to altitude and speed. The release equation is a functional relationship involving the following factors:

(*a*) $f(y_B)$, a function of burst altitude above sea level taken from a potentiometer set by the burst altitude control. The function is required because, although the altitude above sea level is maintained constant in the level-CR mode, the burst altitude above sea level can vary, consequently changing the altitude above burst. The function has been modified to account for the ballistic drag of an average bomb.

(*b*) The instantaneous horizontal ranger $x$ as obtained from a potentiometer driven by the range integrating servo.

(*c*) Aircraft true air speed $V_a$ as defined by the air data computer.

(*d*) Estimated wind velocity $V_W$ as set by the wind control at the control panel.

All of the above noted factors are delivered to the fly-up amplifier of the computer in accordance with the functional relationship of the release equation $$f(y_B, x, V_A, V_W)=0 \tag{6}$$

When the function goes to zero, the fly-up amplifier triggers to initiate the release signal.

No limit indications by the fly-up indicator light are required for this mode, nor are radar slant range or pressure altitude data required for initial range determination.

Before proceeding to a description of the individual component of the system, where such description is desirable, reference will be made to the three dimensional ballistics cam which provides a voltage proportional to the vacuum release angle of divergence E. For an explanation of how the three dimensional cam is evolved, see aforementioned Patent No. 2,910,916. It can be shown that the divergence angle is defined by the equation $$E=\sin^{-1}\left[\frac{\cos T}{2\sqrt{2}}\left(\sqrt{Y+2+\frac{Y}{\sin T}}-\sqrt{Y+2-\frac{Y}{\sin T}}\right)\right] \qquad (7)$$

Since the position of the cam follower on the three dimensional cam gives a voltage proportional to the theoretical angle of divergence E, it is necessary to properly position the cam with respect to its follower. This is done by rotating the cam according to the instantaneous values of the target angle T and longitudinally positioning the follower on the cam according to the non-dimensional height coefficient Y.

As can be seen in FIG. 1, the target angle T can be defined by a trigonometric relationship involving the aircraft height above the burst point and the horizontal range between the aircraft and the burst point. At the point of bomb release the target angle $$T=\tan^{-1}\frac{y'}{x} \qquad (8)$$

Thus in order to establish the target angle and rotationally position the three dimensional cam, the horizontal range $x$ and the altitude above the burst point $y'$ must be determined.

The cam is rotated by the target angle servo motor which uses a bridge circuit input. Electronic analogs of $x$ and $y'$ are introduced into two arms of the bridge, and the feedback potentiometer forms the other two bridge arms. The feedback potentiometer is wound according to the function $\tan T/1+\tan T$. When the bridge is balanced the following relationship exists:

$$\frac{y'}{x}=\frac{\tan T/1+\tan T}{1-(\tan T/1+\tan T)} \qquad (9)$$

It can be seen that right hand side of Equation 9 reduces to tan T, so that Equation 9 is equivalent to Equation 8. It remains to be seen how the analogs of $x$ and $y'$ are obtained.

Either of two methods may be used for the computation of horizontal range. One method is used when radar slant range is available. The other method employs pressure altitude data supplied by an air data computer and is used when radar slant range is not available.

In the method using radar, the initial range $x_0$ is given by a trigonometric relationship involving the aircraft pitch angle and the radar slant range. The relationship is $$x_0=Z\cos P \qquad (10)$$

The radar slant range signal is supplied by the associated radar equipment and is delivered to the initial range computing circuit of the present apparatus. The aircraft pitch angle signal as supplied by the inertial navigator, or a gyroscope made a part of the present bombing computer, is delivered to a gyro pitch angle servo which is a follow-up servo. The output of this servo is a signal representing the pitch angle of the aircraft and is delivered to the initial range computing circuit. The initial range computing circuit performs the computation of the previously mentioned trigonometric relationship so that at any instant the output of the initial range computing circuit is $x_0$.

At any time prior to depressing the pickle button, the initial range $x_0$ is delivered to the range follow-up and range integrating servo of the bombing computer. This servo acts as a follow-up servo prior to depression of the pickle button and as a range servo after the pickle button is depressed. The output of this servo, which represents the instantaneous range $x$, is delivered to the target angle servo.

Pressure data is used to determine horizontal range when radar slant range is not available. Referring to FIG. 1, the initial range in this instance is given by a trigonometric relationship involving the aircraft pitch angle and the height of the aircraft above the target terrain. The relationship is $$x_0—y_0\cot P \qquad (11)$$

The aircraft pitch angle is supplied as before by the gyro pitch angle servo. The height of the aircraft above the target terrain is given by $$y_0=y'+y_B \qquad (12)$$

The burst height above target $y_B$ is manually set into the computer by rotating the burst height control knob at the computer to the desired height. This setting is always equal to the burst height setting of the bomb. The altitude of the aircraft above the burst point is given by $$y'=y_m-y_B \qquad (13)$$

The pressure altitude of the aircraft above sea level is supplied by the air data computer. The burst altitude above sea level is manually set into the present apparatus by rotating the burst altitude control knob at the control panel to the required setting. The $y_B$ signal is subtracted from the $y_m$ signal to give a signal representative of $y'$. This signal is fed to the height servo which is a follow-up servo. The output of the height servo, which represents the instantaneous value of $y'$, is added to $y_B$ to give the value $y_0$, which is then fed to the initial range computing circuit with a signal representing P, so that the initial range $x_0$ can be computed according to Equation 11.

In the low altitude, level, toss and loft modes of bomb delivery and the high altitude, level high speed mode of bomb delivery the initial range $x_0$ is equal to the identification point range $x_{IP}$ which is a known quantity and its value is set into the apparatus by a manual setting at the control panel. In the low altitude, over-the-shoulder mode of bomb delivery, the range $x_0$ is equal to zero, while in the high altitude, cruise mode of bomb delivery the range $x_0$ is established at 50,000 feet.

As previously mentioned, the $x_0$ signal is fed to the range follow-up and range integrating servo to give the instantaneous horizontal range from the pickle point to the release point as determined by the equation $$x=x_0-\int V_G dt \qquad (14)$$

At the instant the pickle button is depressed, the range follow-up servo changes its function to that of range integrating. Simultaneously the $x_0$ input is removed and the true ground speed signal $V_G$, as supplied by the initial navigator, is introduced. Since the range integrating servo has the value of $x_0$ at pickle, it can compute the instantaneous horizontal range $x$ according to the last mentioned equation. The output of the range integrating servo is thus the instantaneous horizontal range $x$ after pickle and is fed to the target angle servo.

The instantaneous height $y'$ has been discussed in connection with range determination inasmuch as it is a factor in determining $x$ and there is no need to reiterate how the $y'$ signal is obtained.

The signals representing the values $x$ and $y'$ are introduced to the target angle servo, previously mentioned, and cause the three dimensional cam to be positoned according to the instantaneous target angle as the aircraft moves through its flight path, before and after pickle. It now remains to describe how the cam follower is longitudinally positioned according to the non-dimensional height parameter Y.

The non-dimensional height parameter Y is defined by an empirical relationship $$Y=\frac{f_1(y')f_4(y_B)}{f_2(Q_c)} \quad (15)$$

where $f_1(y')$=a function of aircraft altitude above the burst point. A signal corresponding to this function is obtained from a potentiometer driven by the height servo.

$f_4(y_B)$=a function of altitude of burst point above sea level. A signal corresponding to this function is obtained when the burst altitude control at the control panel is set for the burst altitude above sea level.

$f_2(O_c)$=a function of impact pressure at the aircraft. A signal corresponding to this function is obtained from the air data computer.

Signals proportional to the foregoing functions are delivered to the L-bridge servo. This servo computes a parameter L as a function of Y which represents the distance that the cam follower proceeds longitudinally along the surface of the three dimensional cam provided in the present apparatus.

It has now been generally described that the three dimensional cam has been rotated to a position that represents the instantaneous target angle T and that the cam follower has been longitudinally positioned to represent the non-dimensional height coefficient Y. It follows, therefore, that the rise of the cam follower provides a signal representative of the theoretical angle of divergence E which can be then used in the summation circuit in accordance with the release equations previously mentioned with respect to the various bombing modes of which the present apparatus is capable.

It is understood that the foregoing represents a theoretical solution to the bombing problem and that certain correction factors have to be taken into account before an actual solution is obtained. This has previously been noted in general terms. The equations which are to be mechanized for the correction factors are presented as functions of measurable or computable independent variables. These functions of variables have been empirically determined from ballistic tables, standard atmospheric tables, and photo-theodolite recordings of flight paths.

Bomb Ballistic Correction B: The following equation, when properly mechanized, corrects the vacuum release angle of divergence E for the non-parabolic bomb trajectory in an atmosphere.

$$B=K_BB'\frac{(y'\pm a)^{1.6}+b}{(T\pm c)^{1.6}+d} \quad (16)$$

where $y'$=altitude above burst in thousands of feet
$T$=offset target angle
$K_B$=mechanization constant
$B'$=ballistic knob setting for a specific weapon and specified range of flight maneuvers.

The present evaluation of available ballistics for toss modes indicates that $K_B$ is .372, $a$ and $b$ are zero, $c$ is $-7°$, and $d$ is 10. Thus the above equation reduces to $$B=.372B'\frac{(y')^{1.6}}{(T-7)^{1.6}+10} \quad (17)$$

For loft and over-the-shoulder release modes this equation is automatically changed so that $K_B$ is .312 and $b$ becomes 40.

$$B=.312B'\frac{(y')^{1.6}+40}{(T-7)^{1.6}+10} \quad (18)$$

Wind Correction W: The component, along the flight path, of a head or tail wind has the effect of displacing and increasing or decreasing the velocity vector of the aircraft with respect to still air. This effect can be expressed, using the small angle approximation as an angular correction to the vacuum ballistic angle of divergence.

$$W=57.3\frac{V_w}{V_a} \quad (19)$$

For ease of mechanization, this equation has been transformed into the following form and has approximately the same value:

$$W=0.17(1-.00041V_a)V_w \quad (20)$$

where $V_w$=on range component of wind, a manual setting on the control panel, positive for head winds, in knots.
$V_a$=true airspeed in feet per second, air input signal from an air data computer.

Angle of Attack Correction A: The true angle of attack is used in the bombing equation to correct for the fact that the sight line axis is not coincident with the velocity vector of the aircraft. This correction is supplied by a signal from an air data system so that there is no need to develop an equation for mechanization. This angle could also be computed in a manner similar to that disclosed in aforementioned Patent No. 2,910,916.

Aircraft Attitude Angle D: This is represented by a signal from inertial navigation equipment. Various functions of attitude angle are used by the present apparatus and, therefore, a position servo is used to convert the electronic signal from the navigational equipment into a shaft position for use in the computer. The input signal defines D only in the range of ±90°. For values of D used in over-the-shoulder bombing, the input signal is related to the parameter used in other modes by the equation:

$$D=-180°-D \quad (21)$$

Since D is positive downward, whenever its value exceeds 90° of climb, a relay is closed to make the necessary changes in circuitry to satisfy the above relationship. It should be noted that input data representing this quantity could also be furnished by a variety of gyroscopic equipments which could be internal or external to the present apparatus.

When any one of the various bombing maneuvers discussed earlier is executed and the pickle button is depressed, an algebraic summation is performed in the present apparatus. Circuits are provided which permit the summation of signals representing electrical analogs of the required quantities. Separate summation equations are used for toss, loft and over-the-shoulder (OTS) maneuvers. The selection of these equations is a function of the desired bombing maneuver and is made by the pilot setting a selector switch according to the bomb maneuver he intends to follow. These equations are:

$$\text{Toss: } D+A+E+B+W+S-T<N \quad (22)$$

$$\text{Loft: } D+A-E-B-W+S+90<N \quad (23)$$

$$\text{OTS: } D+A+E+B+W+S+90<N \quad (24)$$

$$\text{Level-CR: } f(y_B,\ x\ V_a,\ V_w)<N \quad (25)$$

where (N) is the voltage unbalance required to operate the release relay. Bomb release occurs when the appropriate one of the above inequalities is satisfied. As previously noted, the release equation for the level-HS mode of bombing is the same as that for a toss mode of bombing, i.e., Equation 22.

Figure 7:
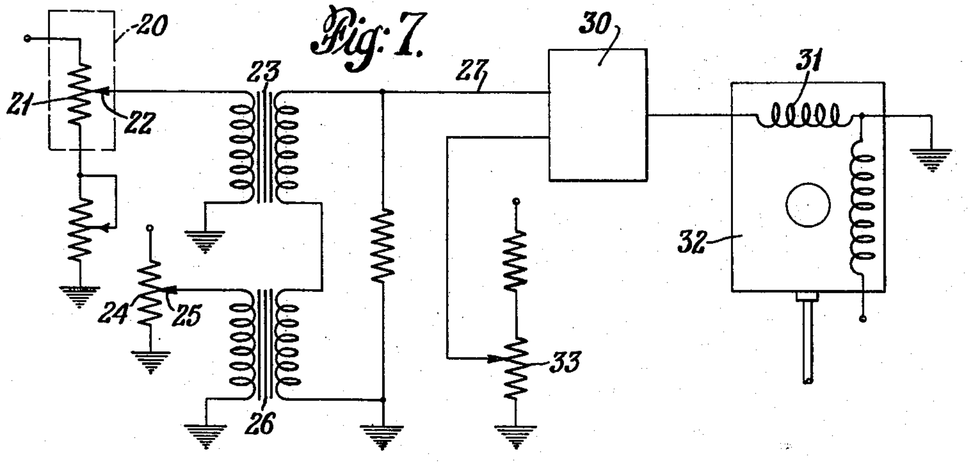
FIG. 7 is a schematic diagram of the height servo circuit.

Turning now to the circuitry employed in mechanizing the equations referred to above, attention will first be directed to the apparatus used to rotationally position the three dimensional cam from which an electrical output proportional to the theoretical angle of divergence E is obtained. As discussed hereinbefore the target angle determination is based upon the quantities $y'$ and $x$. Therefore, the circuits for positioning potentiometers representative of the values $y'$ and $x$ will be described first with reference to FIG. 7. According to Equation 12, $y'=y_m-y_B$. Therefore, mechanization of this equation requires a simple substractive function. A voltage representative of the aircraft altitude above sea level is obtained from the air data computer 20 and applied to potentiometer 21. A brush 22 is positioned along potentiometer 21 to supply the proper voltage, proportional to $y_m$, to transformer 23. Similarly, a voltage is applied across potentiometer 24 and the brush 25 is manually positioned by the pilot to give a voltage output proportional to the desired burst altitude. This voltage is applied to the primary of transformer 26.

The secondary windings of transformers 23 and 26 are serially connected performing the subtracting function to provide a signal on line 27 that is proportional to $y'$. The signal is then amplified in amplifier 30 and applied to the winding 31 of servo motor 32. As the motor rotates, it positions the brushes of potentiometers 33, 34, 35, 104 and 112. Potentiometer 33 is connected in a feedback circuit to arrest rotation of motor 32 at the proper time. The voltage output of the potentiometer is fed back to amplifier 30 in the conventional manner. Potentiometer 34 is in the target angle servo circuit as previously mentioned.

Figure 9:
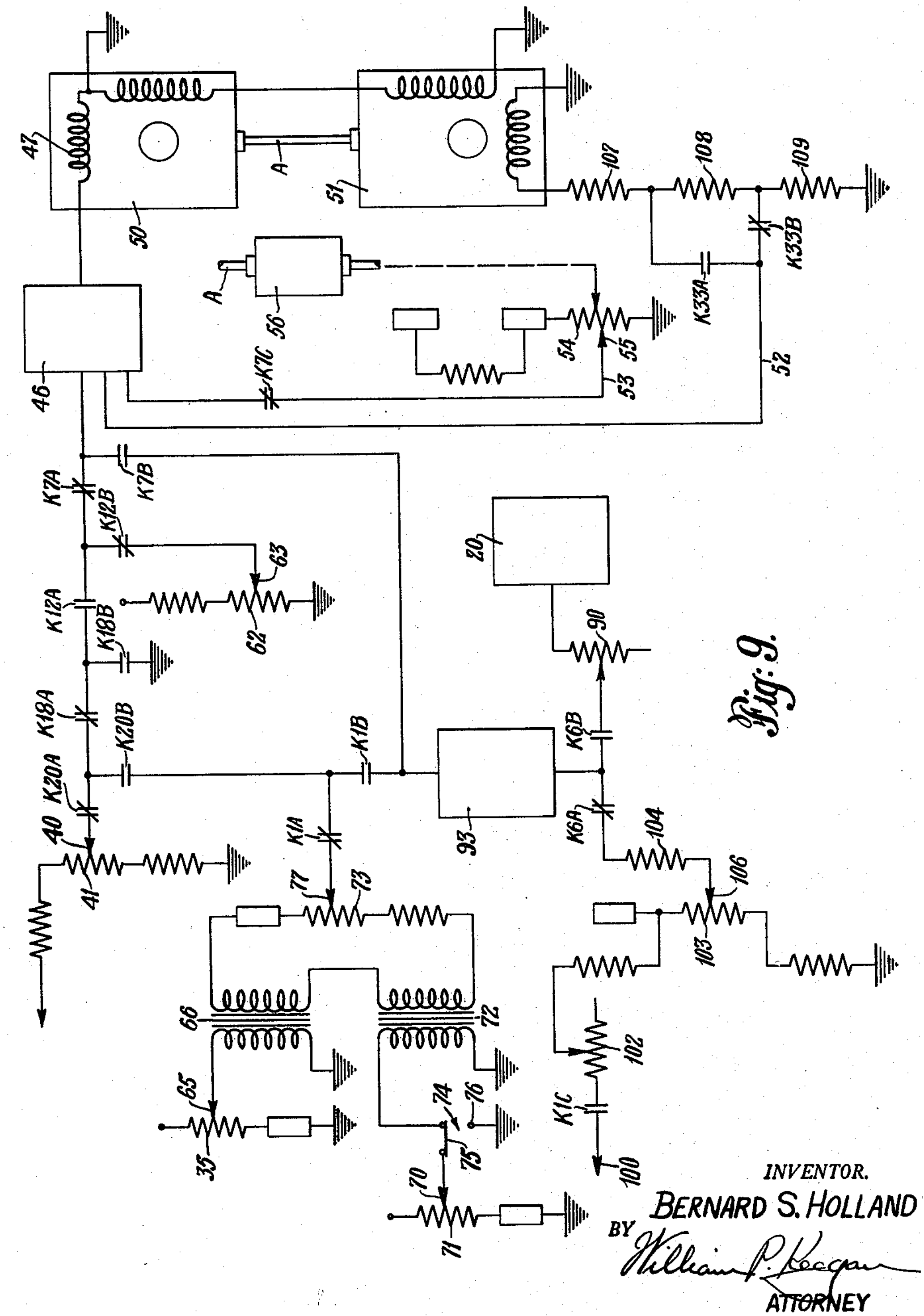
FIG. 9 is a schematic diagram of the horizontal range circuit.

Before returning to consideration of the target angle servo circuit, attention will be directed to the circuit for positioning the brush 36 of potentiometer 37 to give a voltage proportional to the instantaneous horizontal range $x$ of the aircraft from the target. These circuits comprise the horizontal range servo and associated circuitry which performs a dual function in that it first acts as a follow-up servo positioned to the initial range and subsequently performs as a rate servo to continuously correct the range for displacement after pickling. See FIG. 9. It will be recalled from the previous discussion that in the low altitude, level, toss and loft modes of bomb delivery, the horizontal range is determined from an identification point which is a known distance from the target. Consequently, for these modes of bomb delivery, it is only necessary to provide a voltage proportional to the known range. This is accomplished by setting the brush 40 of potentiometer 41. Of course, once the brush is set and the voltage thus determined, the pickle button must be depressed to set the computer functioning when the aircraft passes over the identification point. The same manual setting of initial horizontal range is resorted to for the high altitude, high speed mode of bomb delivery but auxiliary radar equipment is used to determine the proper position for pickling.

The signal obtained by the setting of brush 40 is transmitted through contacts K20A, K18A, K12A and K7A, all of which are engaged to the amplifier 46. The amplified signal is then used to energize the winding 47 of servo motor 50 which mechanically drives the tachometer generator 51 and also drives potentiometers 54, 37, 48 and 49 through a two-speed gear box 56. When the circuit is functioning as a position servo as now, the principal feedback for arresting the servo motor when in the proper position is through line 53. The signal transmitted over line 53 originates from potentiometer 54 and brush 55 which brush is driven by servo motor 50 with the gear box 56 operating at high speed during a position servo operation. In addition, a small feedback signal for servo damping is provided to amplifier 46 through line 52. This signal originates from tachometer 51 and is taken from terminal U which is the common point between resistors L and M and resistor N and goes through the closed contact of relay 92. Operation of this servo loop as a rate servo will be described hereinafter. Of course, servo motor 50 also positions brush 36 on potentiometer 37 which is connected in the target angle circuit to which reference was previously made. Before returning to a consideration of that circuit, attention will be directed to the other input circuits for determining initial range for other bomb delivery modes.

When the bomb delivery mode is a low altitude approach with an over-the-shoulder release, the identification point is the target itself. In other words, the range is zero. This is represented in the circuit by the engagement of contacts K18B and separation contacts K18A. Thus, grounding of line 61 means that the input lead to amplifier 46 is grounded, contacts K12A and K7A also being closed. The feedback circuits for nulling the servo are as before described.

For the high altitude, cruising speed mode of bomb delivery the servo input circuit comprises the potentiometer 62, the brush 63 of which is set to represent a horizontal range of fifty thousand feet. The voltage output of the potentiometer is transmitted through contacts K12B and K7A which are closed for this mode of bomb delivery to the amplifier 46. Contacts 44 are separated. The feedback circuits for nulling the servo are as before described.

Attention will now be directed to the servo input circuit employed when the aircraft is to fly a diving bomb delivery mode, whether a toss release operation or a loft release operation is indicated. A review of the equation for determining $x_0$ in a diving maneuver shows that $x_0=(y'+y_{BT})$ Cot $D$. The brush 65 of potentiometer 35 is positioned by the height servo motor as previously stated. Therefore, the voltage applied to the primary winding of transformer 66 is proportional to the quantity $y'$. The brush 70 of potentiometer 71 is manually positioned by the aircraft pilot to accord with the desired altitude above the target at which the bomb is to burst. The voltage thus obtained is applied to the primary of transformer 72. The secondary windings of transformers 66 and 72 are serially connected so that the sum of the voltages proportional to the quantities $y'$ and $y_{BT}$ is applied to the terminals of potentiometer 73. A single pole, double throw switch 74 is provided in the circuit of brush 70 and transformer 72 whereby the primary winding of transformer 72 can be shorted out when a bomb burst at ground level is desired. In this case, switch blade 75 is moved to engage contact 76. Returning to a consideration of potentiometer 73, the brush 77 thereof is positioned by the pitch angle servo to which attention is now directed.

Figure 8:
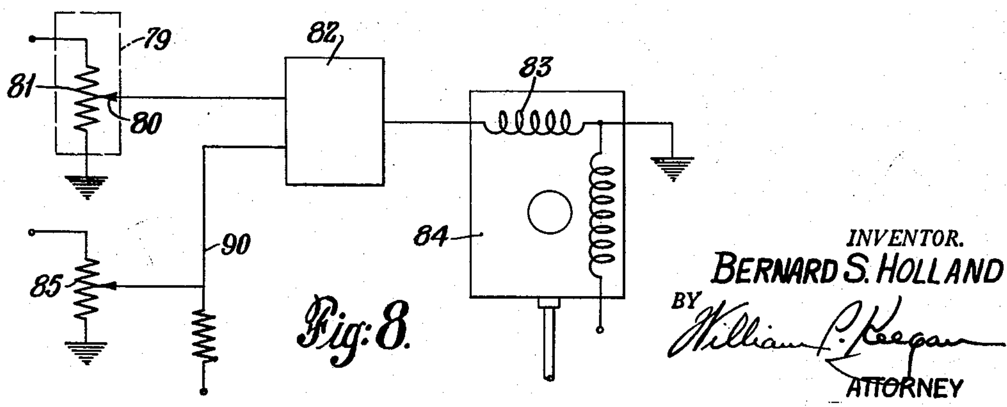
FIG. 8 is a schematic diagram of the pitch angle servo circuit.

Referring to FIG. 8, it is observed that the pitch angle servo is positioned in accordance with the setting of brush 80 of potentiometer 81. The brush position is set by the inertial navigator 79 used in the aircraft and causes a voltage proportional to the pitch (i.e. dive) angle of the aircraft to be transmitted to amplifier 82 and from there to the winding 83 of servo motor 84. Rotation of the servo motor positions the brushes of potentiometers 73, 85, 86, 103 and 160. Potentiometer 85 is used in a feedback circuit 90 to arrest the rotation of the servo motor when it has been properly positioned to indicate the pitch angle of the aircraft. Potentiometer 73 as heretofore mentioned is employed in the horizontal range servo circuit, particularly that portion thereof which determines the initial range in a diving toss or diving loft mode of bomb delivery. The potentiometer is wound so that the position of brush 77 thereon gives a voltage proportional to cotangent D. Since the voltage applied to the terminals of potentiometer 73 is proportional to the quantities $y'+y_{BT}$, the voltage transmitted from brush 77 is proportional to $(y'+y_{BT})$ cotan $D$, or in other words, to $x_0$. This voltage is transmitted through contacts K1A and K20B and closed contacts K18A, K12A and K7A to amplifier 46 and thence to servo motor 50. If a radar slant range signal representing target distance is available, contact K1A will open and contacts K1B and K1C will close. The radar range signal will be applied through calibrating resistor 102 to potentiometer 103. Potentiometer 103, which is positioned by the pitch angle servo previously described, is wound to the consigned function. Therefore the voltage at brush 106 of potentiometer 103 will represent Z consign D, IR, $x_0$. As the radar signal may be direct current, it must be converted into alternating current by modulator 93. It is routed to modulator 93 through calibrating resistor 104 and closed contact K6A. After leaving the modulator it goes through contacts K1B, K20B, K18A, K12A and K7A to amplifier 46 and thence to servo motor 50. The feedback loops for arresting the rotation of the motor are as previously described.

The foregoing discussion considered the introduction of a voltage proportional to the initial range quantity $x_0$ under various bomb delivery modes. However, the quantity desired to position the three dimensional cam to give the theoretical angle of divergence E is $x$ which has been defined by the equation $x=x_0-\int v_G dt$. Therefore, the setting of the horizontal range servo as above described to reflect the initial range $x_0$ has to be continuously modified to reflect the change in range represented by the term $\int v_G dt$. The input to servo motor 50, which may now be considered a rate servo, is taken from the inertial navigator 20. This signal, which may be direct current, is routed to modulator 93 through calibrating resistor 90 and closed contact K6B. At this time the radar slant range signal is no longer needed for positioning the servo, contact K6A is open thus removing the radar signal and thus permitting modulator 93 to be used for converting the ground speed signal to alternating current. The alternating current signal passes through closed contact K33B into amplifier 46, contact K7A being open to prevent application of any initial range signal to the amplifier. When used as a rate servo the only feedback for controlling the proper rate servo speed is taken from line 52. This is the signal from tachometer 51 routed through terminal W which is the junction between resistor 107 and resistors 108 and 109 and is routed to line 52 through closed contact K33A, contact K33B being open. The position feedback from line 53 is prevented from reaching amplifier 46 by opening contact K7C. The speed reducing gear box 56 is operated at low speed to achieve the proper positioning of the brushes on potentiometers 37, 48 and 49. The action of this rate servo is such that the brush 36 of resistor 37 is continuously positioned to the value of aircraft range from the target.

Inasmuch as electronic analogs of $y'$ and $x$ have been determined, it is obvious that the target angle T can be determined to rotationally position the three dimensional vacuum ballistic cam. The cam position is effected by a servo motor, using a bridge circuit as the input. The analogs of $y'$ and $x$ are introduced into the two arms of a bridge, and the feedback potentiometer forms the other two arms. The feedback potentiometer is wound according to the function $$\frac{\tan T}{1+\tan T}$$

Figure 6:
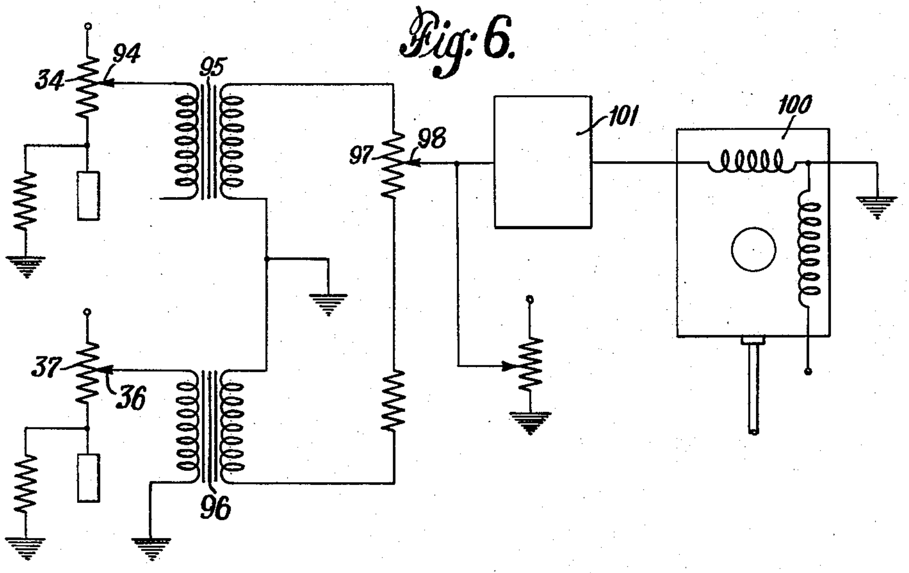
FIG. 6 is a schematic diagram of the target angle servo circuit.

Referring to FIG. 6, the brush 94 of potentiometer 34 is positioned by the height servo described above. The signal, determined by the position of the brush 94, is applied to the primary of transformer 95. The brush 36 of potentiometer 37 is positioned by the range servo described above. The signal, determined by the position of brush 36, is applied to the primary of transformer 96. The secondaries of transformers 95 and 96 are connected together and the connecting wire is grounded so that a voltage proportioned to the ratio of $y'$ and $x$ is obtained for application to the terminals of potentiometer 97. As noted above, this is the feedback potentiometer for the servo loop. The brush 98 of potentiometer 97 transmits the signal through amplifier 101 to actuate motor 100 to the winding thereof through amplifier 101. The three dimensional cam is thus positioned rotationally to the point where the bridge circuit comprising transformers 95 and 96 and the portions of potentiometer 97 separated by brush 98 are in balance. It is, of course, continually positioned during the bombing attack since the range and altitude factors change during the approach to the target. By so controlling the cam a parallax correction, such as the one required in aforementioned Patent No. 2,910,916, is not required in the present bombing system. On the same shaft as the three dimensional cam are the potentiometers 97 and 144, which provide voltages related to the target angle T in certain selected circuits as will be mentioned.

Figure 10:
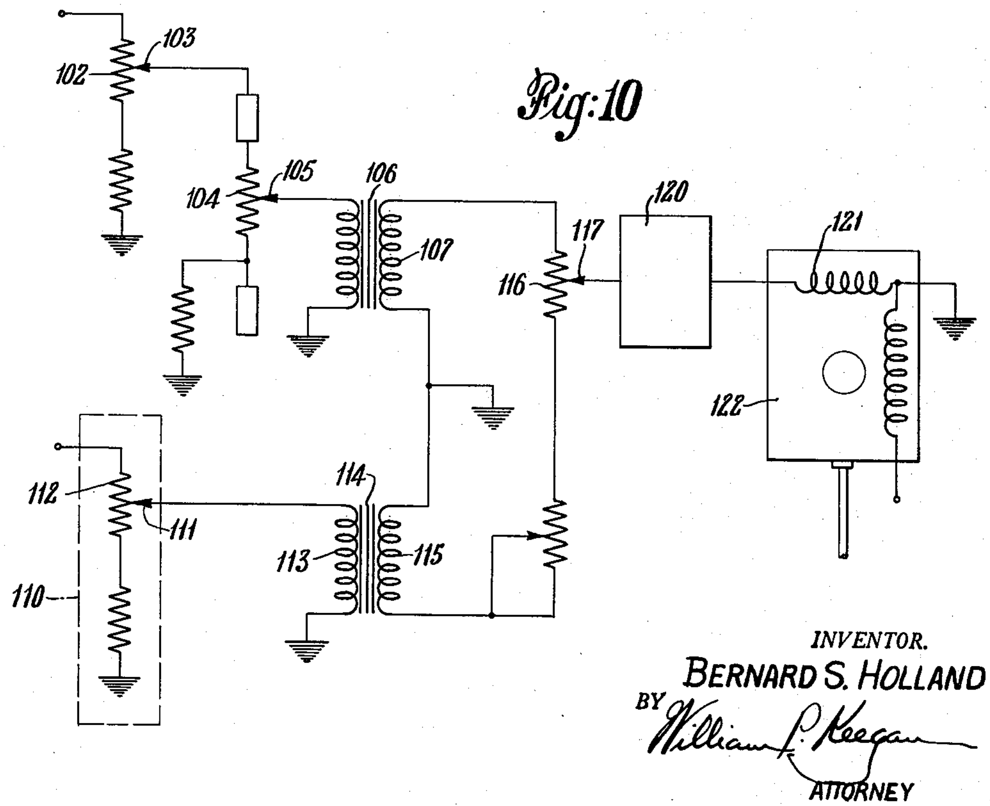
FIG. 10 is a schematic diagram of the L-servo circuit.

Referring now to FIG. 10, the servo loop for longitudinally positioning the cam follower along the cam surface will be described. It will be recalled from the previous discussion that Y is equal to $$\frac{f'(y')f_4(y_B)}{f_2(Q_c)}$$

The potentiometer 102 is connected between the power supply and ground. The potentiometer winding is such that the position of the brush 103 therealong represents a voltage output that is $f_4(y_B)$. The brush itself is positioned manually in accordance with the desired burst height of the bomb. The signal transmitted by brush 103 is applied to potentiometer 104 which is wound to the function $f'(y')$. This potentiometer is one of the height servo potentiometers so its brush 105 is positioned according to quantity $y'$. The series connection of the potentiometers is equivalent to multiplying the two functions as required by the equation for Y. The voltage output transmitted by brush 105 is applied to the primary winding of transformer 106, the secondary winding 107 forming one arm of a bridge circuit.

The voltage representing the denominator of the equation for Y, $f_Z(Q_c)$, is obtained from the air data computer 20 and it also is obtained by the position of a brush 111 on a potentiometer 112 which is wound according to the empirical relationship $f_2(Q_c)$. The voltage transmitted by brush 111 is applied to the primary winding 113 of transformer 114. Secondary winding 115 makes up a second arm of the L bridge. The other two arms of the bridge are made up of potentiometer 116, brush 117 of which transmits the voltage signal to an amplifier 120 and then to winding 121 of the L bridge servo motor 122. Energization of the motor 122 positions the cam follower longitudinally along the three dimensional cam. Brush 117 is positioned by the rotation of motor 122 so that its position will eventually balance the bridge and arrest further rotation of motor 122 and movement of the cam follower.

Having rotationally positioned the three dimensional cam and the longitudinal position of the cam follower thereon, a voltage representative of a theoretical angle of divergence E is obtained for use in the bomb release mechanism circuitry.

Now that the theoretical angle of divergence has been established, attention can be directed to the summation circuit which includes the correction factor circuits that take into account the elements of aim which affect the theoretical performance of a bomb as determined by vacuum ballistics.

Figure 11:
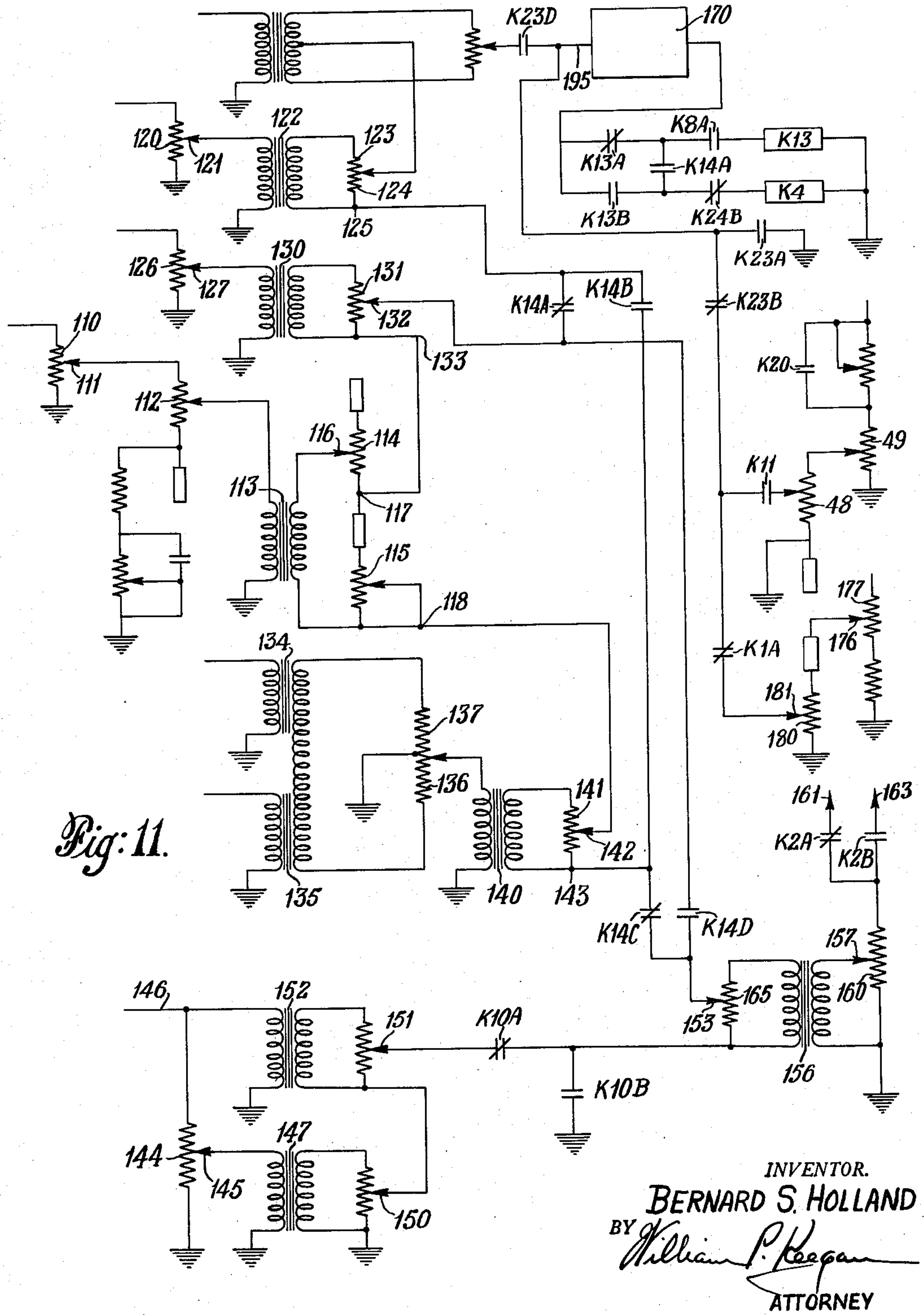
FIG. 11 is a schematic representation of the summation circuit.
Figure 13:
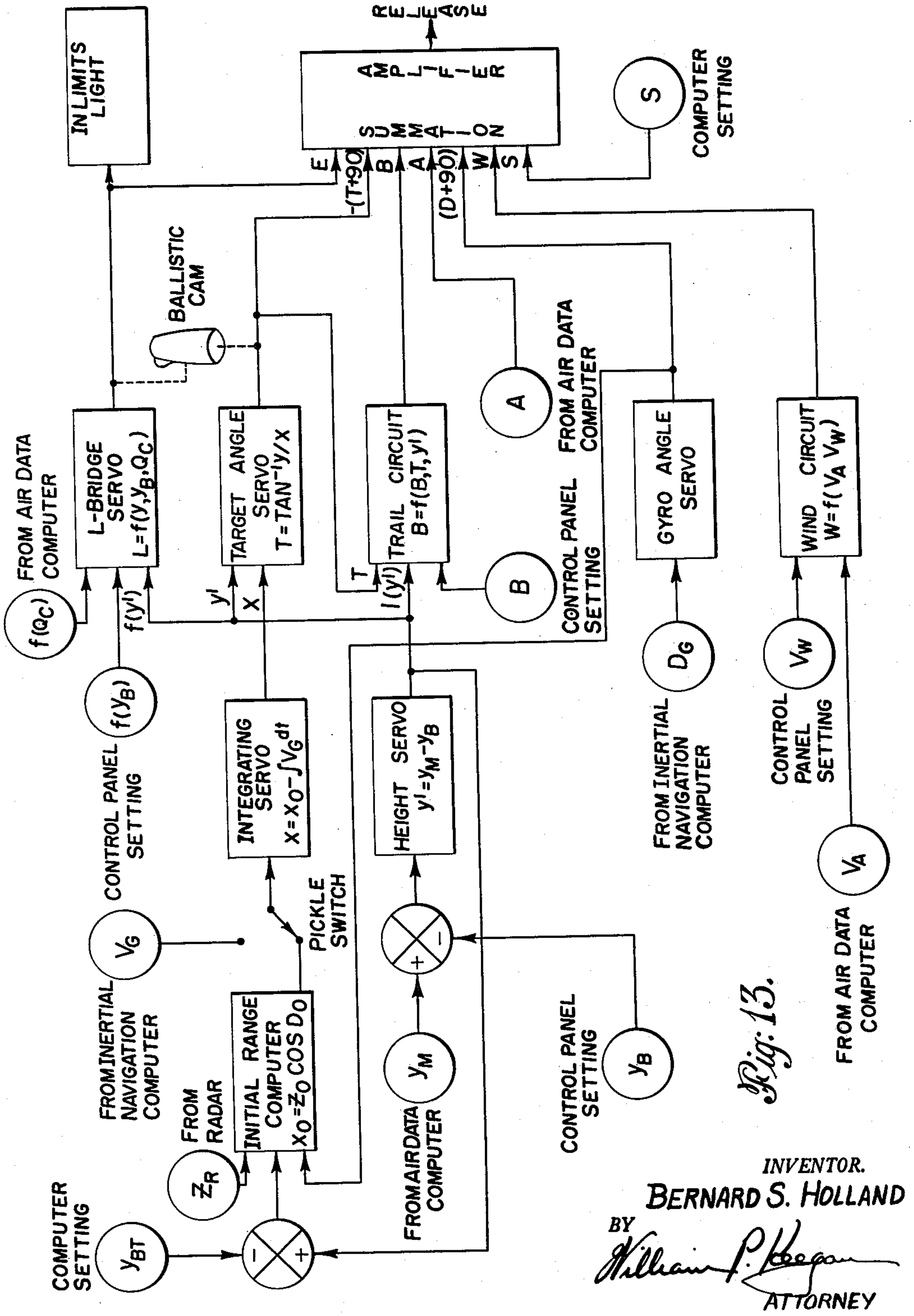
FIG. 13 is a simplified block diagram of the computer apparatus as set for a dive-toss mode of operation.
Figure 14:
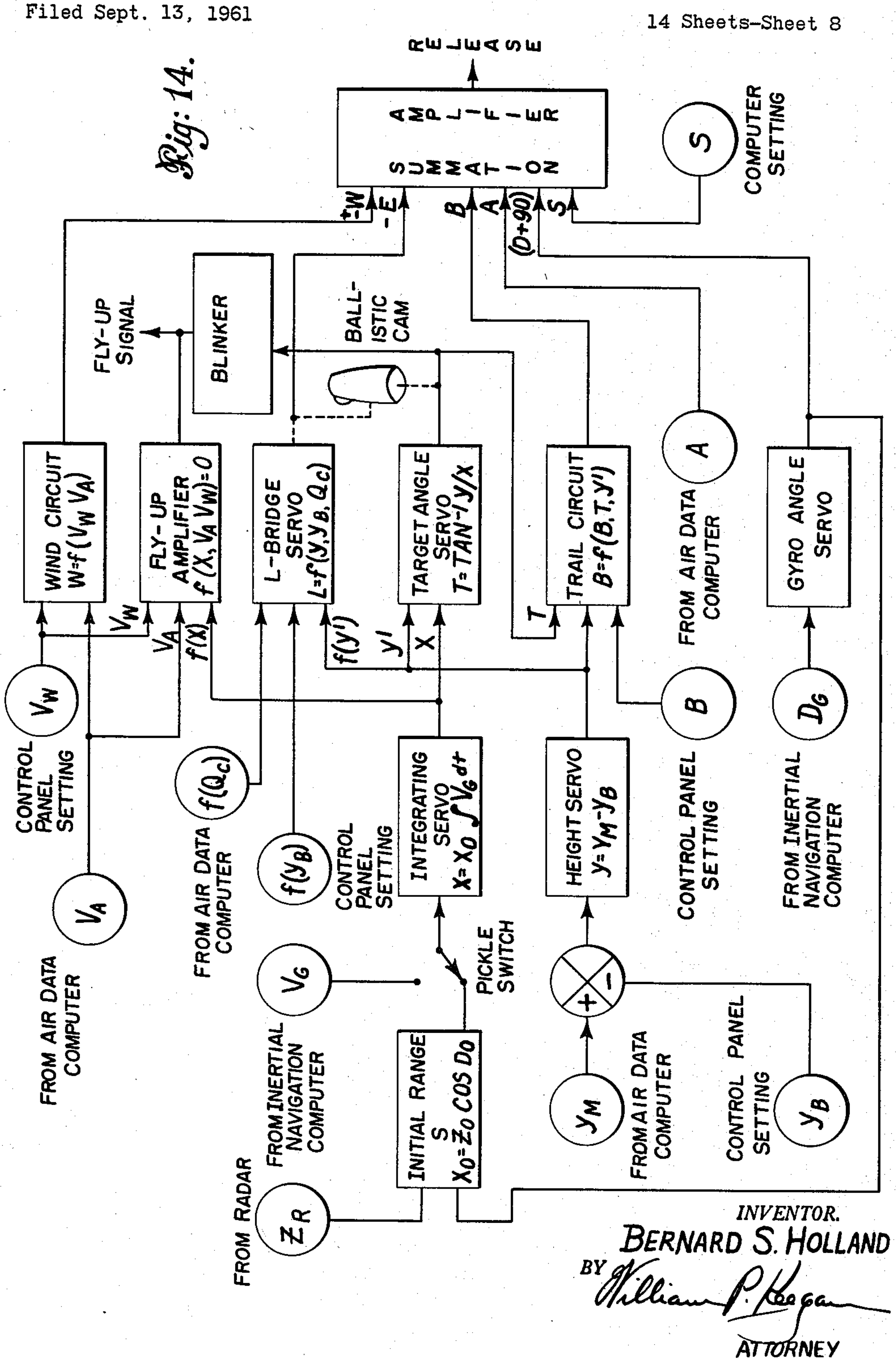
FIG. 14 is a similar block diagram for a dive-loft mode of operation.
Figure 15:
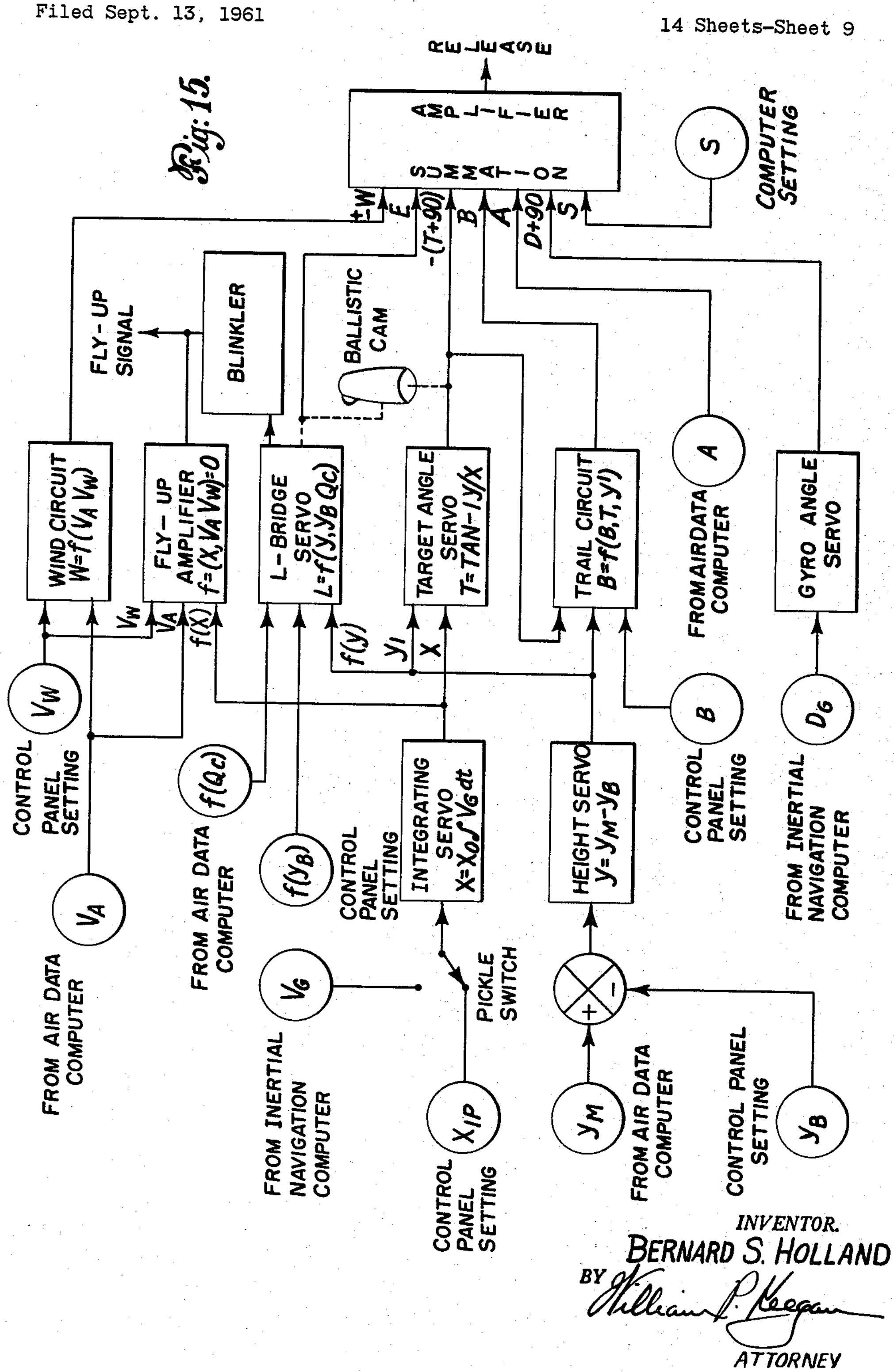
FIG. 15 is a similar block diagram for the low altitude toss and dash modes of operation.
Figure 16:
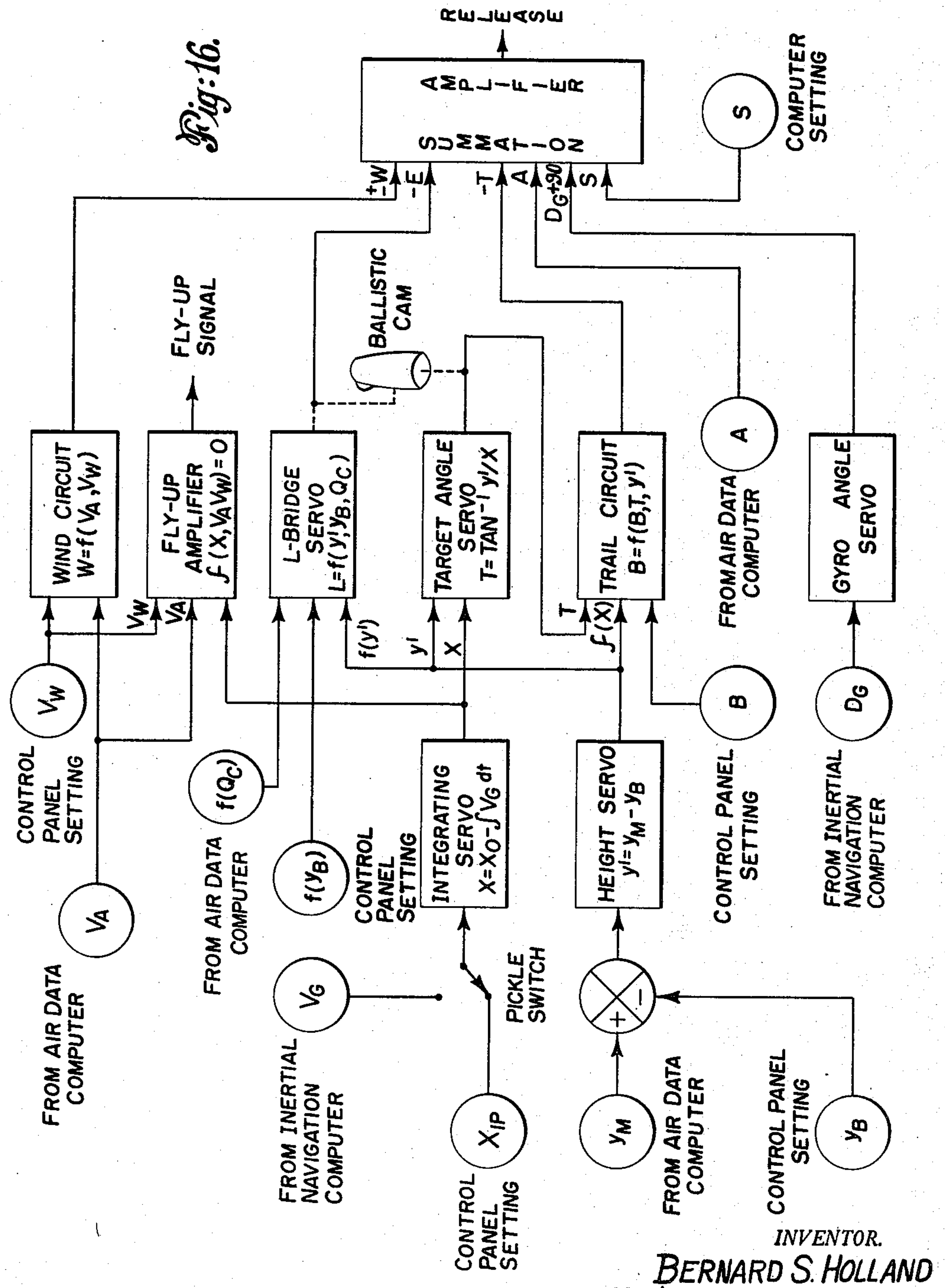
FIG. 16 is a similar block diagram for the low altitude loft-mode of operation.
Figure 17:
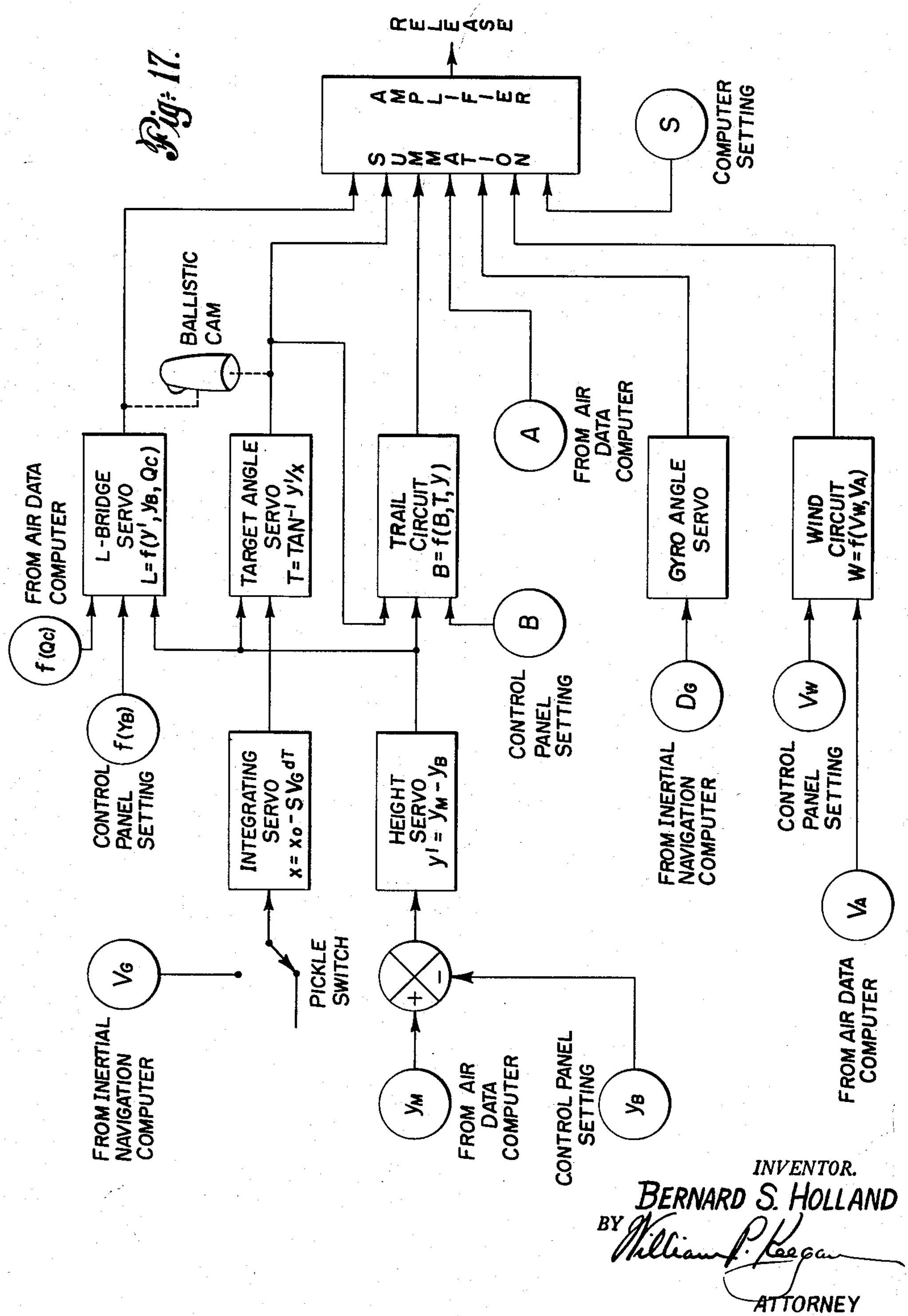
FIG. 17 is a similar block diagram for the low altitude over the shoulder mode of operation.
Figure 18:
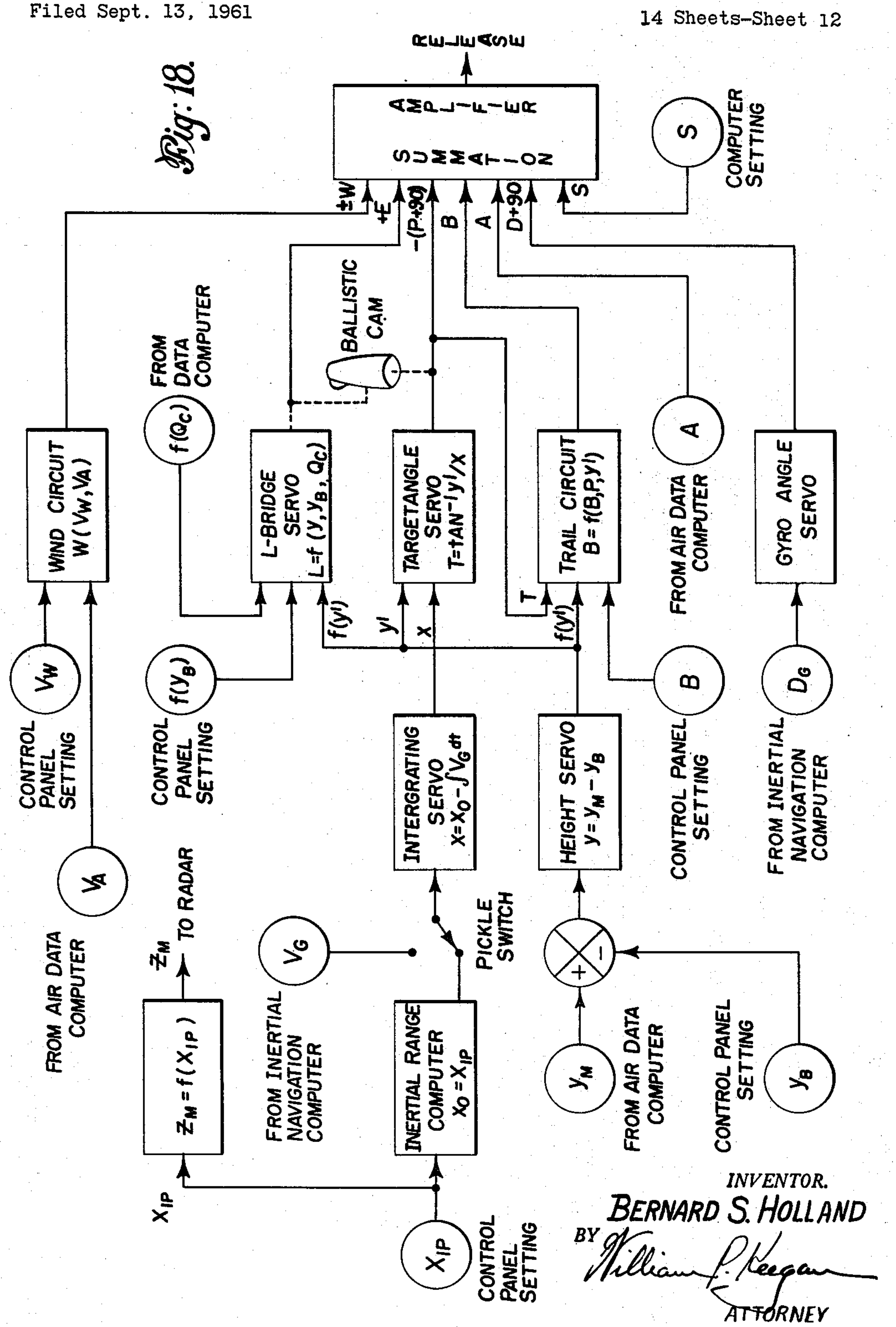
FIG. 18 is a similar block diagram for the level, high altitude high speed mode of operation.
Figure 20:
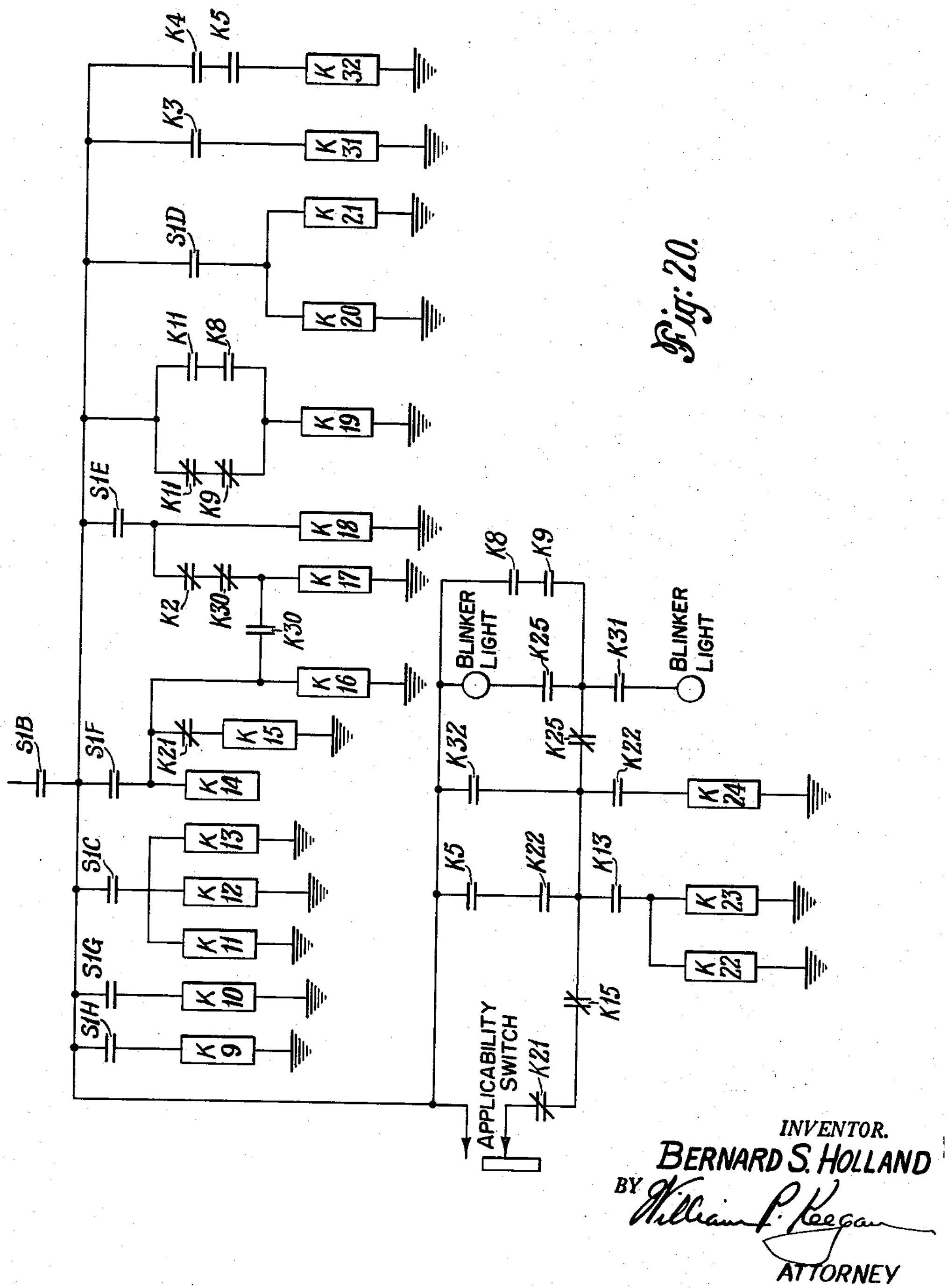
FIG. 20 is a schematic wiring diagram of the relay circuit employed in the computer.

Reference is now made to FIG. 11 which shows the summation circuit. In the present apparatus the only elements of aim that need be taken into account are those of bomb ballistics, wind and angle of attack. The corrections that must be made to the theoretical angle of divergence as determined in accordance with vacuum ballistics have been given by equations 16 and 20.

The angle of trail or bomb ballistic correction circuit is shown to comprise potentiometer 110, the brush 111 of which is manually set by the pilot in accordance with the type bomb that is to be released. The signal thus produced is applied to potentiometer 112 the brush of which is positioned by the height servo motor 32 so that a signal proportional to a function of the quantity $y'$ is represented. In view of the connection between the two potentiometers, a signal proportional to the product of the quantities $K_B$ and $y'$ is obtained and applied to the primary winding of transformer 113. The transformer secondary output is applied across the resistor network comprising potentiometer 114 wound to function such that the output is across calibrating resistor 115. The brush 116 of potentiometer 114 is positioned by the target angle servo motor 100 and the output signal obtained at terminals 117 and 118 is proportional to the bomb drag correction.

The angle of attack correction signal is obtained from a potentiometer 120 contained in the air data computer. The brush 121 is positioned by the air data computer mechanism to the value of the angle of attack and the voltage appearing at brush 121 is the correction signal which is applied to the primary of transformer 122. The output of the transformer is applied to the terminals of calibrating resistor 123 and the voltage between brush 124 and terminal 125 is proportional to the angle of attack.

The voltage proportional to the theoretical angle of divergence E is obtained from the circuit comprising potentiometer 126. The brush 127 of this potentiometer is positioned according to the location of the follower on the three dimensional cam. The signal represented thereby is applied to the primary winding of transformer 130. The utilized signal representing the theoretical angle of divergence is picked off the calibrating resistor 131 and appears across brush 132 and terminal 133.

The wind correction voltage which is utilized in the summation circuit is obtained from the circuit comprising transformers 134 and 135. The setting of brush 136 on potentiometer winding 137 is manually effected by the pilot in accordance with intelligence received generally prior to the start of the bombing mission. The potentiometer itself is connected to the secondaries of transformers 134 and 135. The signal thus obtained is applied to the primary of transformer 140. A calibrating potentiometer 141 is connected to the transformer secondary and the desired voltage equivalent of the wind correction factor is obtained between brush 142 and terminal 143.

The next component of the summation circuit that must be described is the circuit which gives the attitude of the attacking aircraft during the bombing maneuver. Potentiometer 153 is connected to the secondary of transformer 156, the primary of which is energized according to the setting of brush 157 on the potentiometer 110. The brush is positioned in accordance with the action of the pitch servo so that the output of transformer 156 is proportional to the attitude of attacking aircraft. The terminal of the potentiometer is connected either to power supply 161 through contacts K2A or to power supply 163 through the normally separated contacts K2B. The former power supply is an in-phase voltage while the latter is a voltage differing one hundred and eighty degrees from the former. Here again the reason for such an arrangement will be described later in the specification. In this circuit, the potentiometer 144, the brush 145 of which is set by the target angle servo in accordance with the angle T as previously described, is connected between the voltage source 146 and ground. The brush 145 of the potentiometer is positioned by the target angle servo so that its setting produces a voltage proportional to the target angle which is applied to the primary of transformer 147. The setting of brush 150 gives a voltage output which is proportional to the negative target angle T. Another voltage component proportional to the angle $-90°$ is obtained by the setting of brush 151 on the secondary of transformer 152. The brush 151 is connected in series with the potentiometer 153 through contacts K10A. Contacts K10B, which are normally separated, connect the potentiometer to ground for the reason which will be explained later.

The brush 165 which is set on potentiometer 153 provides a signal output therefrom proportional to the attitude of the aircraft, plus 90°. This signal is transmitted to the junction between contacts K14C and K14D and, therefore, through one of the contacts to the other circuit components of the summation circuit. Thus, the circuit described sums voltages proportional to the theoretical angle of divergence, the angle of attack correction, the bomb drag correction, the wind correction, and the attitude of the aircraft. It is when the voltage proportional to the aircraft attitude equals the other voltages, as defined by the summation equations 22, 23 and 24, that the signal for bomb release is given.

If it is assumed that contacts K14C and K14A are engaged, then the wind correction voltage W, the bomb drag voltage B, the theoretical angle of divergence voltage E, and the angle of attack voltage A are added together as positive quantities. As shown in the summation equation, such a summation is effected during the low altitude toss and loft maneuvers, the level high speed maneuver and the low altitude over-the-shoulder maneuver.

On the other hand, when contacts K14C and K14A are separated and contacts K14D and K14B engaged, the polarities of the theoretical angle of divergence voltage E, the bomb drag voltage B, and the wind voltage W are reversed with respect to the angle of attack voltage, which condition is shown to be the proper one for the lofting maneuvers. (See equation 23.)

The aircraft attitude component circuit can be seen to give a voltage proportional to $-T-90+90$ when contacts K10A are engaged or a voltage proportional to $+90$ when contacts K10A are separated and contacts K10B engaged. From the summation equations, it is seen that the first mentioned voltage proportional to $-T-90+90$ is utilized for the low attitude loft and toss maneuvers and the level high speed maneuver so that contacts K10A are engaged (as shown) for these maneuvers. The voltage proportional to $+90$ is utilized, according to the summation equations, for the dive loft and toss maneuvers and the low attitude over-the-shoulder maneuver. Consequently, contacts K10A are separated and contacts K10B engaged for these latter maneuvers.

The voltage output of the summation circuit is transmitted to the amplifier 172 and through contacts K13A and K8A to the bomb release relay K3. This relay controls the release of the bomb in the conventional way and so need not be described.

In the level cruise mode of bomb release, the summation circuit just described is not utilized. Rather the brush 176 of potentiometer 177 is set in accordance with the desired burst height of the bomb. The signal thus obtained provides a voltage for application to potentiometer 180 the brush 181 of which is set by the horizontal range servo. The brush is connected through contacts K1A and K23B to amplifier 172 and the bomb release relay.

As previously mentioned, the fly-up equation is $$K_3\,x-(V_a-V_w)=0$$

Figure 12:
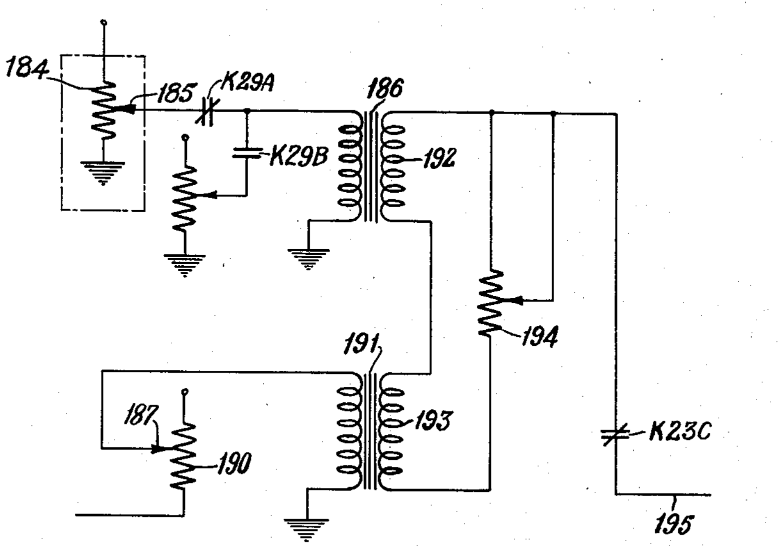
FIG. 12 is a schematic representation of the fly-up circuit.

This circuit is mechanized as follows: (See FIG. 12). The potentiometer 184 and its brush 185 are in the air data computer so that the setting of the brush gives a signal which is proportional to the true airspeed of the aircraft. The signal thus produced is applied to the primary of transformer 186. The horizontal wind speed along the flight path is established by manually setting brush 187 of potentiometer 190. The voltage proportional to wind speed is applied to the primary of transformer 191. Transformer secondaries 192 and 193 are serially connected so that an output voltage, which is applied to variable resistor 194, proportional to $V_a+V_u$ is obtained and transmitetd to amplifier 172 as was the signal from conductor 195. When the conditions prescribed by the fly-up equation are fulfilled, the amplifier output causes the fly-up relay K4 to be actuated, contacts K13B and K24B being closed or engaged. Upon receipt of the fly-up signal, which may be a flashing light, the pilot begins his pull-up maneuver. Initiation of such maneuver causes contacts K23C and K23B to separate and contacts K23D and K23A to engage. The net result is to reconnect the summation circuit that is used to compute bomb release to amplifier 172 so that various elements of aim can be added to the theoretical angle of divergence to compute the bomb release point as previously described.

The selection of the desired bomb release mode is effected by the aircraft pilot manually setting the selector switch. The actuation of the mechanical switching contacts is shown in the table designated FIG. 22 and the relays operated thereby are shown in FIG. 21. It is believed that the relay operation need not be described inasmuch as the relay contacts were mentioned when describing the circuits in conjunction with which they are used.

It is understood that many variations and changes can be made to the apparatus and circuits heretofore described without departing from the spirit and scope of the invention and, therefore, the specification and drawings are to be interpreted as illustrative rather than in a limiting sense.

What is claimed is:

1. An integrated bombing apparatus for releasing a bomb at the point where the flight path of the aircraft is tangent to the trajectory of the bomb which will intersect the desired target, said apparatus being adapted to determine the required release point in the aircraft flight path in terms of an instantaneous geometric angular relationship between the aircraft and the target and comprising a three dimensional ballistic cam for determining a theoretical angle of divergence, an electrical means for providing a signal representative thereof, electrical means for providing a signal representative of a bomb drag correction factor to be applied to said angle of divergence, electrical means for providing a signal representative of a wind correction factor to be applied to said angle of divergence, electrical means for providing a signal representative of the attitude of the aircraft plus 90°, electrical means for providing a signal representative of the negative of the target angle minus 90°, means connecting the aforesaid electrical means in a summation circuit which controls release of a bomb, and means for switching the connecting means so that the electrical signals are summed in different relationships for different bombing maneuvers.

2. A bombing apparatus according to claim 1 including means for disconnecting the electrical means for providing a signal representative of the negative of the target angle minus 90° from the summation circuit for the loft and over-the-shoulder (OTS) modes of bomb delivery.

3. A bombing apparatus according to claim 1 including a servo motor for rotating said cam as the aircraft traverses its flight path in accordance with the instantaneous target angle.

4. A bombing apparatus according to claim 3 including control means for said servo motor, said control means including a first potentiometer the brush of which is set according to the height of the aircraft above the desired burst altitude and a second potentiometer the brush of which is set according to the horizontal range of the aircraft from the target, a first transformer which is energized according to the setting of the brush of said first potentiometer, a second transformer which is energized according to the setting of the brush of said second potentiometer, and a feedback potentiometer which is wound in accordance with a function of the tangent of the target angle and which is serially connected to the transformer secondaries to provide a bridge circuit.

5. A bombing apparatus according to claim 4 wherein the feedback potentiometer is wound according to the function $$\frac{\tan T}{1-\tan T}.$$

6. A bombing apparatus according to claim 4 including a height servo motor to set the brush of the aforesaid first potentiometer and control means for said height servo motor, said control means comprising a first potentiometer the brush of which is set according to the height of the aircraft, a first transformer energized in accordance with the setting of said first potentiometer brush, a second potentiometer the brush of which is set according to the desired burst altitude of the bomb, and a second transformer energized in accordance with the setting of said second potentiometer brush, the secondary windings of said transformers being serially connected so as to give a voltage signal which is equal to the difference in the voltage output of said transformers.

7. A bombing apparatus according to claim 4 including a horizontal range servo motor to set the brush of the aforesaid second potentiometer and control means for said range servo motor, said control means comprising means for positioning said range servo in accordance with an initial range and means for continually changing the position of said servo in response to the change in horizontal range of the aircraft from the target.

8. A bombing apparatus according to claim 7 including a tachometer generator driven by said servo motor, a speed changer unit driven by said servo motor, a first feedback circuit having a potentiometer the brush of which is set by said servo motor through the intermediary of said speed change unit, a second feedback circuit energized by said tachometer generator, means providing a relatively high feedback through said first feedback circuit and a relatively low feedback through said second feedback circuit when said servo is being positioned in accordance with the initial range and a relatively high feedback through said second feedback circuit only when said servo is continually repositioned in response to the change in horizontal range of the aircraft from the target.

9. A bombing apparatus according to claim 7 wherein the means for continually changing the position of said servo in response to the change in aircraft horizontal range include an input signal which is energized in accordance with the true ground speed of the aircraft.

10. A bombing apparatus according to claim 7 wherein the means for positioning said servo in accordance with an initial range include a first potentiometer the brush of which is set in accordance with the range of an identification point from the target, means connecting the brush of said potentiometer to the servo motor for the loft low, the loft high and the level high speed modes of bomb delivery, and means for disconnecting said brush from said servo motor and connecting a ground point thereto for the loft over the shoulder mode of bomb delivery.

11. A bombing apparatus according to claim 10 including a first potentiometer the brush of which is set by the height servo motor, a first transformer which is energized in accordance with the setting of said brush, a second potentiometer the brush of which is set in accordance with the desired burst altitude of the bomb, a second transformer which is energized in accordance with the setting of said brush, means connecting the secondaries of said transformers in series with a potentiometer wound as a function of the cotangent of the pitch angle of the aircraft the brush of which is set in accordance with the pitch angle of the aircraft, and means for selectively connecting said last named brush to the servo motor for the dive low and dive high modes of bomb delivery while disconnecting other brushes used for other bomb delivery modes from said servo motor.

12. A bombing apparatus according to claim 11 including a potentiometer wound as a function of the cosine of the pitch angle of the aircraft, means for applying a radar signal proportional to the slant range from the aircraft to the target, means to position the brush of said potentiometer in accordance with the pitch angle of the aircraft, means connecting said brush to the servo motor for dive low and dive high modes of bomb delivery using radar while disconnecting other brushes used for other bomb delivery modes from said servo motor.

References Cited in the file of this patent

UNITED STATES PATENTS

| | | |
|---|---|---|
| 2,898,809 | Ryan | Aug. 11, 1959 |
| 2,910,916 | Fauteck et al. | Nov. 3, 1959 |
| 2,988,960 | Helgeson et al. | June 20, 1961 |
| 2,995,984 | Helgeson | Aug. 15, 1961 |
| 3,003,398 | Lalli | Oct. 10, 1961 |

OTHER REFERENCES

Aviation Week, Bombing System Keyed to New Indicator by Philip Klass, July 22, 1957, pages 62, 63, 65, to 69, Copy in Div. 10.